(12) United States Patent
Odenwalder et al.

(10) Patent No.: US 8,391,249 B2
(45) Date of Patent: Mar. 5, 2013

(54) CODE DIVISION MULTIPLEXING COMMANDS ON A CODE DIVISION MULTIPLEXED CHANNEL

(75) Inventors: Joseph P. Odenwalder, Rancho Santa Fe, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1319 days.

(21) Appl. No.: 10/611,333

(22) Filed: Jun. 30, 2003

(65) Prior Publication Data

US 2004/0160933 A1 Aug. 19, 2004

Related U.S. Application Data

(60) Provisional application No. 60/448,269, filed on Feb. 18, 2003, provisional application No. 60/452,790, filed on Mar. 6, 2003, provisional application No. 60/470,225, filed on May 12, 2003, provisional application No. 60/470,770, filed on May 14, 2003.

(51) Int. Cl.
*H04B 7/216* (2006.01)
(52) U.S. Cl. ........................... 370/335; 370/342
(58) Field of Classification Search .................. 370/335, 370/342, 465; 375/512, 149
See application file for complete search history.

(56) References Cited

U.S. PATENT DOCUMENTS

| | | | |
|---|---|---|---|
| 2,149,518 A | 3/1939 | Frank, Sr. | |
| 3,470,324 A | 9/1969 | Harmuth | |
| 4,768,023 A | 8/1988 | Xie | |
| 5,280,472 A | 1/1994 | Gilhousen et al. | |
| 5,394,433 A | 2/1995 | Bantz et al. | |
| 5,406,585 A | 4/1995 | Rohani et al. | |
| 5,463,342 A | 10/1995 | Guard et al. | |
| 5,483,557 A | 1/1996 | Webb et al. | |
| 5,490,165 A | 2/1996 | Blakeney, II et al. | |
| 5,535,214 A | 7/1996 | Shiobara | |
| 5,544,156 A | 8/1996 | Teder et al. | |
| 5,553,062 A | 9/1996 | Schilling et al. | |
| 5,581,575 A | 12/1996 | Zehavi et al. | |
| 5,592,470 A | 1/1997 | Rudrapatna et al. | |
| 5,627,938 A | 5/1997 | Johnston et al. | |
| 5,647,366 A | 7/1997 | Weng et al. | |
| 5,712,869 A | 1/1998 | Lee et al. | |
| 5,719,852 A | 2/1998 | Schilling et al. | |
| 5,726,978 A | 3/1998 | Frodigh et al. | |

(Continued)

FOREIGN PATENT DOCUMENTS

| | | |
|---|---|---|
| CN | 1166094 | 11/1997 |
| CN | 1263675 | 8/2000 |

(Continued)

OTHER PUBLICATIONS

International Search Report—PCT/US04/04669, International Search Authority—European Patent Office—Jul. 27, 2004.

(Continued)

*Primary Examiner* — Chandrahas Patel
(74) *Attorney, Agent, or Firm* — Sayed H. Beladi; Won Tae Kim

(57) ABSTRACT

An apparatus includes a first encoder for receiving a plurality of symbol streams for respective ones of a plurality of mobile stations and encoding each of the symbol streams with one of a plurality of covering sequences to form a plurality of covered sequences. The apparatus further includes a summer for summing the plurality of covered sequences to form a first Code Division Multiplexed (CDM) signal. In addition, the apparatus includes a second encoder for covering the first CDM signal with a covering sequence to form a first covered CDM signal. A system and method for multiplexing plurality of symbol streams are also provided.

25 Claims, 9 Drawing Sheets

U.S. PATENT DOCUMENTS

| | | | |
|---|---|---|---|
| 5,732,391 A | 3/1998 | Fiocca | |
| 5,745,480 A | 4/1998 | Behtash et al. | |
| 5,752,193 A | 5/1998 | Scholefield et al. | |
| 5,754,537 A | 5/1998 | Jamal et al. | |
| 5,764,551 A | 6/1998 | McCorkle et al. | |
| 5,774,809 A | 6/1998 | Tuutijarvi et al. | |
| 5,781,861 A | 7/1998 | Kang et al. | |
| 5,809,059 A | 9/1998 | Souissi et al. | |
| 5,815,526 A | 9/1998 | Rice et al. | |
| 5,857,174 A | 1/1999 | Dugan | |
| 5,862,451 A | 1/1999 | Grau et al. | |
| 5,864,760 A | 1/1999 | Gilhousen et al. | |
| 5,875,214 A | 2/1999 | Urbaniak et al. | |
| 5,903,608 A | 5/1999 | Chun et al. | |
| 5,914,950 A * | 6/1999 | Tiedemann et al. | 370/348 |
| 5,920,705 A | 7/1999 | Lyon et al. | |
| 5,923,650 A | 7/1999 | Chen et al. | |
| 5,938,749 A | 8/1999 | Rusu et al. | |
| 5,956,642 A | 9/1999 | Larsson et al. | |
| 5,966,377 A | 10/1999 | Murai et al. | |
| 5,966,670 A | 10/1999 | Keskitalo et al. | |
| 5,969,751 A | 10/1999 | Lee et al. | |
| 5,973,642 A | 10/1999 | Li et al. | |
| 5,991,271 A | 11/1999 | Jones et al. | |
| 5,991,273 A | 11/1999 | Abu-Dayya et al. | |
| 6,005,876 A | 12/1999 | Cimini, Jr. et al. | |
| 6,014,373 A | 1/2000 | Schilling et al. | |
| 6,046,980 A | 4/2000 | Packer | |
| 6,049,716 A | 4/2000 | Jung | |
| 6,052,594 A | 4/2000 | Chuang et al. | |
| 6,061,359 A * | 5/2000 | Schilling et al. | 370/441 |
| 6,064,692 A | 5/2000 | Chow et al. | |
| 6,085,091 A | 7/2000 | Yoo et al. | |
| 6,088,387 A | 7/2000 | Gelblum et al. | |
| 6,094,459 A | 7/2000 | Kao et al. | |
| 6,101,168 A | 8/2000 | Chen et al. | |
| 6,108,374 A | 8/2000 | Balachandran et al. | |
| 6,108,384 A | 8/2000 | Okumura et al. | |
| 6,111,911 A | 8/2000 | Sanderford, Jr. et al. | |
| 6,115,357 A | 9/2000 | Packer et al. | |
| 6,128,283 A | 10/2000 | Sabaa et al. | |
| 6,128,349 A | 10/2000 | Chow et al. | |
| 6,128,882 A | 10/2000 | Jones et al. | |
| 6,130,882 A | 10/2000 | Levin et al. | |
| 6,131,016 A | 10/2000 | Greenstein et al. | |
| 6,134,215 A * | 10/2000 | Agrawal et al. | 370/209 |
| 6,134,218 A | 10/2000 | Holden | |
| 6,141,388 A | 10/2000 | Servais et al. | |
| 6,144,654 A | 11/2000 | Ibanez-Meier et al. | |
| 6,151,696 A | 11/2000 | Miller et al. | |
| 6,195,552 B1 | 2/2001 | Jeong et al. | |
| 6,201,576 B1 | 3/2001 | Raghunath et al. | |
| 6,201,954 B1 | 3/2001 | Soliman et al. | |
| 6,205,129 B1 | 3/2001 | Esteves et al. | |
| 6,208,699 B1 | 3/2001 | Chen et al. | |
| 6,208,858 B1 | 3/2001 | Antonio et al. | |
| 6,219,374 B1 | 4/2001 | Kim et al. | |
| 6,222,875 B1 | 4/2001 | Dahlman et al. | |
| 6,222,888 B1 | 4/2001 | Kao et al. | |
| 6,230,203 B1 | 5/2001 | Koperda et al. | |
| 6,233,455 B1 | 5/2001 | Ramakrishna et al. | |
| 6,259,746 B1 | 7/2001 | Levin et al. | |
| 6,292,515 B1 | 9/2001 | Kao et al. | |
| 6,298,041 B1 | 10/2001 | Packer | |
| 6,307,844 B1 | 10/2001 | Tsunehara et al. | |
| 6,335,922 B1 | 1/2002 | Tiedemann, Jr. et al. | |
| 6,347,080 B2 | 2/2002 | Jou et al. | |
| 6,363,255 B1 | 3/2002 | Kuwahara | |
| 6,389,056 B1 * | 5/2002 | Kanterakis et al. | 375/130 |
| 6,414,988 B1 | 7/2002 | Ling | |
| 6,425,105 B1 | 7/2002 | Piirainen et al. | |
| 6,426,960 B2 | 7/2002 | Antonio | |
| 6,442,130 B1 | 8/2002 | Jones, IV et al. | |
| 6,456,653 B1 | 9/2002 | Sayeed | |
| 6,483,816 B2 | 11/2002 | Tsunehara et al. | |
| 6,490,461 B1 | 12/2002 | Muller et al. | |
| 6,496,496 B1 | 12/2002 | Ramakrishna et al. | |
| 6,505,058 B1 | 1/2003 | Willey | |
| 6,507,585 B1 | 1/2003 | Dobson | |
| 6,512,925 B1 | 1/2003 | Chen et al. | |
| 6,532,363 B1 | 3/2003 | Pussinen | |
| 6,535,723 B1 | 3/2003 | Jiang et al. | |
| 6,549,561 B2 | 4/2003 | Crawford et al. | |
| 6,563,885 B1 | 5/2003 | Magee et al. | |
| 6,570,444 B2 | 5/2003 | Wright et al. | |
| 6,571,101 B1 | 5/2003 | Schulz | |
| 6,571,104 B1 | 5/2003 | Nanda et al. | |
| 6,574,205 B1 | 6/2003 | Sato et al. | |
| 6,590,879 B1 | 7/2003 | Huang et al. | |
| 6,597,913 B2 | 7/2003 | Natarajan | |
| 6,609,007 B1 | 8/2003 | Eibling et al. | |
| 6,654,609 B2 | 11/2003 | Kim | |
| 6,680,925 B2 | 1/2004 | Wu et al. | |
| 6,693,892 B1 | 2/2004 | Rinne et al. | |
| 6,694,469 B1 | 2/2004 | Jalali et al. | |
| 6,701,151 B2 | 3/2004 | Diachina et al. | |
| 6,711,208 B2 | 3/2004 | Razoumov et al. | |
| 6,741,862 B2 | 5/2004 | Chung et al. | |
| 6,744,754 B1 | 6/2004 | Lee et al. | |
| 6,751,264 B2 * | 6/2004 | Ho et al. | 375/267 |
| 6,751,444 B1 | 6/2004 | Meiyappan et al. | |
| 6,757,241 B1 | 6/2004 | Jones et al. | |
| 6,760,303 B1 | 7/2004 | Brouwer | |
| 6,775,544 B2 | 8/2004 | Ficarra | |
| RE38,603 E | 9/2004 | Kim et al. | |
| 6,816,827 B1 | 11/2004 | Xia et al. | |
| 6,836,666 B2 | 12/2004 | Gopalakrishnan et al. | |
| 6,847,826 B1 | 1/2005 | Wesby et al. | |
| 6,847,828 B2 | 1/2005 | Miyoshi et al. | |
| 6,865,389 B2 | 3/2005 | Lee et al. | |
| 6,876,641 B2 | 4/2005 | Banister | |
| 6,880,103 B2 | 4/2005 | Kim et al. | |
| 6,898,418 B2 | 5/2005 | Rauschmayer et al. | |
| 6,904,286 B1 | 6/2005 | Dantu | |
| 6,917,581 B2 | 7/2005 | Proctor, Jr. et al. | |
| 6,937,582 B1 | 8/2005 | Kronestedt et al. | |
| 6,952,561 B1 | 10/2005 | Kumar et al. | |
| 6,982,946 B2 | 1/2006 | Wiberg et al. | |
| 6,987,798 B2 | 1/2006 | Ahn et al. | |
| 6,996,763 B2 | 2/2006 | Sarkar et al. | |
| 7,006,429 B2 | 2/2006 | Yoshida et al. | |
| 7,012,912 B2 | 3/2006 | Naguib et al. | |
| 7,016,651 B1 | 3/2006 | Narasimhan et al. | |
| 7,031,741 B2 | 4/2006 | Lee et al. | |
| 7,047,473 B2 | 5/2006 | Hwang et al. | |
| 7,050,406 B2 | 5/2006 | Hsu et al. | |
| 7,054,275 B2 | 5/2006 | Kim et al. | |
| 7,061,986 B2 | 6/2006 | Tonissen et al. | |
| 7,068,702 B2 | 6/2006 | Chen et al. | |
| 7,069,038 B2 | 6/2006 | Hakkinen et al. | |
| 7,072,315 B1 | 7/2006 | Liu et al. | |
| 7,076,001 B2 | 7/2006 | Beadle et al. | |
| 7,092,706 B2 | 8/2006 | Yang et al. | |
| 7,099,397 B2 | 8/2006 | Lee et al. | |
| 7,103,021 B2 | 9/2006 | Jou | |
| 7,120,134 B2 | 10/2006 | Tiedemann, Jr. et al. | |
| 7,126,928 B2 | 10/2006 | Tiedemann, Jr. et al. | |
| 7,126,930 B2 | 10/2006 | Pankaj et al. | |
| 7,155,236 B2 | 12/2006 | Chen et al. | |
| 7,158,504 B2 | 1/2007 | Kadaba et al. | |
| 7,164,669 B2 | 1/2007 | Li et al. | |
| 7,177,367 B2 | 2/2007 | Storm et al. | |
| 7,187,646 B2 | 3/2007 | Schramm et al. | |
| 7,190,964 B2 | 3/2007 | Damnjanovic et al. | |
| 7,197,085 B1 | 3/2007 | Vella-Coleiro et al. | |
| 7,215,930 B2 | 5/2007 | Malladi et al. | |
| 7,245,600 B2 | 7/2007 | Chen | |
| 7,257,101 B2 | 8/2007 | Petrus et al. | |
| 7,269,186 B2 | 9/2007 | Abrol et al. | |
| 7,269,389 B2 | 9/2007 | Petrus et al. | |
| 7,272,199 B2 | 9/2007 | Storm et al. | |
| 7,274,743 B2 | 9/2007 | Kim et al. | |
| 7,277,709 B2 | 10/2007 | Vadgama | |
| 7,280,562 B2 | 10/2007 | Sindhushayana et al. | |
| 7,286,558 B2 | 10/2007 | Kim et al. | |
| 7,286,846 B2 | 10/2007 | Chen et al. | |
| 7,289,529 B2 | 10/2007 | Sherman | |

| | | | | | | |
|---|---|---|---|---|---|---|
| 7,299,402 | B2 | 11/2007 | Soong et al. | 2004/0208139 A1 | 10/2004 | Iwamura et al. |
| 7,313,167 | B2 | 12/2007 | Yoon et al. | 2004/0224711 A1 | 11/2004 | Panchal et al. |
| 7,315,527 | B2 | 1/2008 | Wei et al. | 2004/0228288 A1 | 11/2004 | Seol et al. |
| 7,317,711 | B2 | 1/2008 | Bae et al. | 2004/0228349 A1 | 11/2004 | Vrzic et al. |
| 7,327,716 | B2 | 2/2008 | Fong et al. | 2004/0228389 A1 | 11/2004 | Odenwalder et al. |
| 7,336,640 | B2 | 2/2008 | McDonough et al. | 2005/0002324 A1 | 1/2005 | Sutivong et al. |
| 7,336,954 | B2 | 2/2008 | Wang et al. | 2005/0004970 A1 | 1/2005 | Jain et al. |
| 7,418,064 | B2 | 8/2008 | Wei et al. | 2005/0007986 A1 | 1/2005 | Malladi et al. |
| 7,423,992 | B2 | 9/2008 | Iwamura et al. | 2005/0030911 A1 | 2/2005 | Tiedemann, Jr. et al. |
| 7,447,258 | B2 | 11/2008 | Pietila et al. | 2005/0176456 A1 | 8/2005 | Chen et al. |
| 7,447,287 | B1 | 11/2008 | Parantainen | 2005/0254465 A1 | 11/2005 | Lundby et al. |
| 7,463,702 | B2 | 12/2008 | Ammer et al. | 2006/0007892 A1 | 1/2006 | Sudo et al. |
| 7,505,780 | B2 | 3/2009 | Wei et al. | 2006/0019701 A1 | 1/2006 | Ji |
| 7,706,403 | B2 | 4/2010 | Hosein | 2006/0128410 A1 | 6/2006 | Derryberry et al. |
| 8,023,950 | B2 | 9/2011 | Malladi et al. | 2006/0156166 A1 | 7/2006 | Sarkar et al. |
| 8,150,407 | B2 | 4/2012 | Ho et al. | 2006/0165126 A1 | 7/2006 | Petersson et al. |
| 2001/0012271 | A1 | 8/2001 | Berger | 2006/0183497 A1 | 8/2006 | Paranchych et al. |
| 2001/0019541 | A1 | 9/2001 | Jou et al. | 2006/0215737 A1 | 9/2006 | Bang et al. |
| 2001/0021180 | A1 | 9/2001 | Lee et al. | 2006/0264220 A1 | 11/2006 | Chen et al. |
| 2002/0012334 | A1 | 1/2002 | Strawczynski et al. | 2007/0030820 A1 | 2/2007 | Sarkar et al. |
| 2002/0015388 | A1 | 2/2002 | Kim et al. | 2007/0111669 A1 | 5/2007 | Malladi et al. |
| 2002/0018446 | A1 | 2/2002 | Huh et al. | 2007/0206623 A1 | 9/2007 | Tiedemann, Jr. et al. |
| 2002/0021683 | A1 | 2/2002 | Holtzman et al. | 2008/0043683 A1 | 2/2008 | Kwon et al. |
| 2002/0021692 | A1 | 2/2002 | Huh et al. | 2008/0194286 A1 | 8/2008 | Chen et al. |
| 2002/0042283 | A1 | 4/2002 | Moulsley | 2009/0052573 A1 | 2/2009 | Tiedemann, Jr. et al. |
| 2002/0051432 | A1 | 5/2002 | Shin | 2009/0083602 A1 | 3/2009 | Sarkar et al. |
| 2002/0057730 | A1 | 5/2002 | Karlsson et al. | 2010/0135156 A1 | 6/2010 | Sarkar |
| 2002/0067774 | A1 | 6/2002 | Razoumov et al. | 2010/0309954 A1 | 12/2010 | Odenwalder |
| 2002/0089923 | A1 | 7/2002 | Yoshida et al. | 2011/0009066 A1 | 1/2011 | Malladi |
| 2002/0093918 | A1 | 7/2002 | Kim et al. | | | |
| 2002/0111183 | A1 | 8/2002 | Lundby et al. | FOREIGN PATENT DOCUMENTS | | |
| 2002/0131522 | A1 | 9/2002 | Felgentreff et al. | EP | 0627827 A2 | 12/1994 |
| 2002/0136271 | A1 | 9/2002 | Hiramatsu et al. | EP | 0771084 A1 | 5/1997 |
| 2002/0137521 | A1 | 9/2002 | Kim et al. | EP | 0783210 A2 | 7/1997 |
| 2002/0150077 | A1 | 10/2002 | Temerinac | EP | 0809364 | 11/1997 |
| 2002/0154610 | A1 | 10/2002 | Tiedemann, Jr. et al. | EP | 0912016 A2 | 4/1999 |
| 2002/0160767 | A1 | 10/2002 | Hanly | EP | 0921652 A2 | 6/1999 |
| 2002/0167907 | A1 | 11/2002 | Sarkar et al. | EP | 0996304 A1 | 4/2000 |
| 2002/0172192 | A1 | 11/2002 | Hunzinger et al. | EP | 1104127 | 5/2001 |
| 2002/0172217 | A1 | 11/2002 | Kadaba et al. | EP | 1168703 A2 | 1/2002 |
| 2002/0172264 | A1 | 11/2002 | Wiberg et al. | EP | 1231807 A2 | 8/2002 |
| 2002/0176362 | A1 | 11/2002 | Yun et al. | EP | 1236471 A2 | 9/2002 |
| 2002/0183039 | A1 | 12/2002 | Padgett et al. | EP | 1257140 A1 | 11/2002 |
| 2002/0191570 | A1 | 12/2002 | Kim et al. | EP | 1292057 A1 | 3/2003 |
| 2002/0191677 | A1 | 12/2002 | Chen et al. | EP | 0809364 | 10/2003 |
| 2003/0028251 | A1 | 2/2003 | Mathews | EP | 1326471 | 12/2008 |
| 2003/0031130 | A1 | 2/2003 | Vanghi | GB | 2301687 A | 12/1996 |
| 2003/0035466 | A1 | 2/2003 | Proctor, Jr. et al. | GB | 2352944 A | 2/2001 |
| 2003/0039317 | A1 | 2/2003 | Taylor et al. | JP | 4111553 A | 4/1992 |
| 2003/0050084 | A1 | 3/2003 | Damnjanovic et al. | JP | 6350562 A | 12/1994 |
| 2003/0050086 | A1 | 3/2003 | Lee et al. | JP | 08298498 A | 12/1996 |
| 2003/0058953 | A1 | 3/2003 | Lee et al. | JP | 09312629 | 12/1997 |
| 2003/0067899 | A9 | 4/2003 | Chen et al. | JP | 10013325 A | 1/1998 |
| 2003/0072392 | A1 | 4/2003 | Beadle et al. | JP | 11098120 A | 4/1999 |
| 2003/0073443 | A1 | 4/2003 | Bae et al. | JP | 11154919 A | 6/1999 |
| 2003/0081538 | A1 | 5/2003 | Walton et al. | JP | 11196043 | 7/1999 |
| 2003/0083069 | A1 | 5/2003 | Vadgama | JP | 11508417 T | 7/1999 |
| 2003/0087651 | A1 | 5/2003 | Rauschmayer et al. | JP | 2000299680 A | 10/2000 |
| 2003/0118086 | A1 | 6/2003 | Pietila et al. | JP | 2000513549 | 10/2000 |
| 2003/0123392 | A1 | 7/2003 | Ruutu et al. | JP | 2000349740 | 12/2000 |
| 2003/0129981 | A1 | 7/2003 | Kim | JP | 200106139 A | 1/2001 |
| 2003/0137953 | A1 | 7/2003 | Chae et al. | JP | 2001036500 A | 2/2001 |
| 2003/0142656 | A1 | 7/2003 | Padovani et al. | JP | 2001238269 A | 8/2001 |
| 2003/0152102 | A1 | 8/2003 | Morgan et al. | JP | 2001515300 T | 9/2001 |
| 2003/0156593 | A1 | 8/2003 | McDonough et al. | JP | 2001517017 T | 10/2001 |
| 2003/0161340 | A1 | 8/2003 | Sherman | JP | 2001523918 | 11/2001 |
| 2003/0210735 | A1 | 11/2003 | Ahn et al. | JP | 2002-026808 | 1/2002 |
| 2003/0219037 | A1 | 11/2003 | Toskala et al. | JP | 200277984 | 3/2002 |
| 2004/0001536 | A1 | 1/2004 | Lohtia et al. | JP | 2002508137 T | 3/2002 |
| 2004/0013102 | A1 | 1/2004 | Fong et al. | JP | 2002508896 T | 3/2002 |
| 2004/0091067 | A1 | 5/2004 | Ammer et al. | JP | 2002159061 A | 5/2002 |
| 2004/0101035 | A1 | 5/2004 | Boer et al. | JP | 2002522988 T | 7/2002 |
| 2004/0137931 | A1 | 7/2004 | Sarkar et al. | JP | 2002-232943 | 8/2002 |
| 2004/0158790 | A1 | 8/2004 | Gaal et al. | JP | 2002528954 T | 9/2002 |
| 2004/0160914 | A1 | 8/2004 | Sarkar et al. | JP | 2002531992 | 9/2002 |
| 2004/0160922 | A1 | 8/2004 | Nanda et al. | JP | 2002534020 | 10/2002 |
| 2004/0162083 | A1 | 8/2004 | Chen et al. | JP | 2002539672 A | 11/2002 |
| 2004/0162098 | A1 | 8/2004 | Wei et al. | JP | 2003008521 A | 1/2003 |
| 2004/0203973 | A1 | 10/2004 | Khan | JP | 2003018117 | 1/2003 |

| | | |
|---|---|---|
| JP | 2003032218 | 1/2003 |
| JP | 2003060606 A | 2/2003 |
| JP | 2003060609 A | 2/2003 |
| JP | 2003069523 A | 3/2003 |
| JP | 2004032518 A | 1/2004 |
| JP | 2004166038 A | 6/2004 |
| JP | 2004214746 | 7/2004 |
| JP | 2004320679 A | 11/2004 |
| JP | 2005-505955 | 2/2005 |
| JP | 2005505168 | 2/2005 |
| JP | 2008072733 A | 3/2008 |
| JP | 4755084 | 6/2011 |
| KR | 19960015862 | 11/1996 |
| KR | 0156478 B1 | 11/1998 |
| KR | 100214293 | 5/1999 |
| KR | 20020074739 A | 10/2002 |
| KR | 20020076991 | 10/2002 |
| KR | 20020085674 A | 11/2002 |
| KR | 20020089164 | 11/2002 |
| KR | 20020092136 | 12/2002 |
| KR | 100406531 | 11/2003 |
| RU | 2073913 | 2/1997 |
| RU | 2073913 C1 | 2/1997 |
| RU | 2111619 C1 | 5/1998 |
| RU | 2115246 C1 | 7/1998 |
| RU | 2120198 C1 | 10/1998 |
| RU | 2149518 C1 | 5/2000 |
| RU | 2183910 C2 | 6/2002 |
| RU | 2189696 C2 | 9/2002 |
| TW | 477129 | 2/2002 |
| TW | 481963 | 4/2002 |
| TW | 504914 | 10/2002 |
| WO | WO9205556 A1 | 4/1992 |
| WO | WO9507578 A1 | 3/1995 |
| WO | WO9510144 A1 | 4/1995 |
| WO | WO9512297 A1 | 5/1995 |
| WO | WO9701256 A1 | 1/1997 |
| WO | WO9733399 A1 | 9/1997 |
| WO | WO9835525 A2 | 8/1998 |
| WO | WO9836606 A2 | 8/1998 |
| WO | WO9845966 | 10/1998 |
| WO | WO9901994 A2 | 1/1999 |
| WO | WO9904525 | 1/1999 |
| WO | WO9907089 A1 | 2/1999 |
| WO | WO9912282 A1 | 3/1999 |
| WO | WO9926371 | 5/1999 |
| WO | 9929054 | 6/1999 |
| WO | WO0008869 A2 | 2/2000 |
| WO | WO0038368 A1 | 6/2000 |
| WO | WO0038444 | 6/2000 |
| WO | WO0042752 A1 | 7/2000 |
| WO | WO0048328 A1 | 8/2000 |
| WO | WO0054437 | 9/2000 |
| WO | WO0065743 A1 | 11/2000 |
| WO | WO0072622 A1 | 11/2000 |
| WO | WO0106714 | 1/2001 |
| WO | WO0110159 A1 | 2/2001 |
| WO | WO0117158 A1 | 3/2001 |
| WO | WO0124568 A1 | 4/2001 |
| WO | WO0128127 | 4/2001 |
| WO | WO0141318 A2 | 6/2001 |
| WO | WO0180475 | 10/2001 |
| WO | WO0199303 A2 | 12/2001 |
| WO | WO0199312 A1 | 12/2001 |
| WO | WO0201762 A1 | 1/2002 |
| WO | WO0223792 A1 | 3/2002 |
| WO | WO0231991 | 4/2002 |
| WO | WO0233838 A2 | 4/2002 |
| WO | WO0237693 A2 | 5/2002 |
| WO | WO0237872 A2 | 5/2002 |
| WO | WO0239595 | 5/2002 |
| WO | WO 0241531 A2 | 5/2002 |
| WO | WO0245327 | 6/2002 |
| WO | WO02060142 A2 | 8/2002 |
| WO | WO02063818 A1 | 8/2002 |
| WO | WO02065664 | 8/2002 |
| WO | WO02065664 A2 | 8/2002 |
| WO | WO02080400 A2 | 10/2002 |
| WO | WO02082108 A1 | 10/2002 |
| WO | WO02095960 | 11/2002 |
| WO | WO03003592 | 1/2003 |
| WO | WO03007530 A2 | 1/2003 |
| WO | WO03084163 A1 | 10/2003 |
| WO | WO2005015942 A1 | 2/2005 |

OTHER PUBLICATIONS

Written Opinion—PCT/USO4/04669, International Search Authority—European Patent Office, Jul. 27, 2004.
International Preliminary Examination Report—PCT/US04/04669, International Preliminary Examining Authority—IPEA/US, May 21, 2008.
"Mobile Station-Base Station Compatibility Standard for Wideband Spread Spectrum Cellular Systems," TIA/EIA Interim Standard, Feb. 3, 1999, XP002145331, pp. 6-380,6 (TIA/EIA-95-B).
"The CDMA 2000 ITU-R RTT Candidate Submission (0.18)," Telecommunications Industry Association TIA, Jul. 27, 1998, XP002294165, pp. 1-145.
"Universal Mobile Telecommunications System (UMTS); Physical channels and mapping of transport channels onto physical channels (FDD) (3GPP TS 25.211 version 5.3.0 Release 5)", ETSI TS 125 211 v 5.3.0 (Dec. 2002), pp. 1-52.
3G TS 25.211 "Physical channels and mapping of transport channels onto physical channels (FDD)", Release 5, V5.0.0, Mar. 2002.
3G TS 25.212 "Multiplexing and channel coding (FDD)", Release 5, V5.0.0, Mar. 2002.
3G TS 25.213 "Spreading and modulation (FDD)", Release 5, V5.0.0, Mar. 2002.
3G TS 25.214 "Physical layer procedures (FDD)", Release 5, V5.0.0, Mar. 2002.
3GPP2 C.50024: cdma2000 High Rate Packet Data Air interface Specification', 3RD Generation Partnershif Project 2, "3GPP2" Sep. 12, 2000. pp. I xxxix, 6-1-6-77, 8-1-8-54.
3rd Generation Partnership Project, Technical Specification Group Radio Access Network: 3GPP TS 25.322 V4.7.0; Radio Access Link Control (RLC) Protocol Specification; Release 4, Dec. 2002, pp. 1-76.
Gyung-Ho Hwang et al. Distributed Rate Control for Throughput Maximization and DOS Support in WCDMA System', 2001 IEEE, Oct. 7-11, 2001, pp. 1721-1725.
Nandagopal T et al: "Service differentiation through end-to-end rate control in low bandwidth wireless packet networks" Mobile Multimedia Communications, 1999. 1999 IEEE International workshop on San Diego, CA USA Nov. 15-17, 1999 Piscataway, NJ, USA IEEE.
Sarkar S et al., "Adaptive Control of the Reverse Link in CDMA2000", International Journal of Wireless Information Networks, Plenum Press, NY, US, vol. 9, No. Jan. 1, 2002, pp. 55-70, XP002300880, ISSN: 1068-9605.
Sarkar S., et al., "CDMA2000 Reverse Link: Design and System Performance" VTC 2000-Fall. IEEE VTS 52nd, Vehicular Technology Conference, Boston, MA, Sep. 24-28, 2000. vol. 6 of 6 Conf. 52, pp. 2713-2719.
Sohn et al., "Blind Rate Detection Algorithm in WCDMA Mobile Receiver", IEEE 54th Vehicular Technology Conference Proceedings, Atlantic City, NJ, Oct. 7, 2001, pp. 1589-1592.
Sunay, M, Oguz, et al.: "Provision of Variable Data Rates in Third Generation Wideband DS CDMA System,"wireless Communications and Networking Conference, 1999, Sep. 21, 1999, pp. 505-509.
The CDMA 2000 ITU-R RTT Candidate Submission 0. 18 Online Jul. 27, 1998.
TIA/EIA-95; "Mobile Station- Base Station Compatibility Standard for Wideband Spread Spectrum Cellular Systems"(Apr. 1999).
TIA/EIA/IS-856-1;"CDMA2000 High Rate Packet Data Air Interface Specification" Addendum 1 (Jun. 2002).
You Y--H, et al.: MC-VSG BNET System for High-Rate Wireless Personal Area Network Applications, IEEE Transactions on Consumer Electronics, IEEE Inc., New York US, vol. 48, No. 2, May 2002, pp. 254-264.
Young-Joo Song et al. "Rate-control Snoop : A Reliable Transport Protocol for Heterogeneous Networks with Wired and Wireless Links", IEEE Proceedings 2003, vol. 2, Mar. 16, 2003, pp. 1334-1338.

Young-Uk Chung et al, "An Efficient Reverse Link Data Rate Control Scheme for 1xEV-DV System," IEEE 54TH. Vehicular Technology Conference Proceedings. Atlantic City, NJ, Oct. 7-11, 2001. IEEE, US. vol. 1 of 4, Conf. 54, Oct. 10, 2001, pp. 820-823.

3GPP2 C: "CDMA 2000 High Rate Packet Data Air Interface Specification C.S0024" 3GPP Standards, Sep. 12, 2000, XP002206456.

Chakravarty S et al: An Algorithm for Reverse Traffic Channel Rate Control for CDMA 2000 High Rate Packet Data Systems "GLOBECOM"OI. 2001 IEEE Global Telecommunications Conference. San Antonio, TX, Nov. 25-29, 2001, IEEE Global Telecommunications Conference, NewYork, NY : IEEE, US, x vol. vol. 6 of 6, Nov. 25, 2001, pp. 3733-3737, XP002277693.

Attar et al., "A Reverse Link Outer-Loop Control Algorithm for cma2000 1xEV Systems," IEEE International Conference on Communications, New York, NY, Apr. 28, 2002, pp. 573-578.

Hamaguchi, et al., "Characteristics of Orthogonal Slow-FH/16QAM method applying Interference-resistant Demodulation," Proceedings of Inst. Of Electronics, Information and Communication Engineers, B-II, Jun. 25, 1995, vol. J78, B-II, No. 6, pp. 445-453.

Sarkar S., et al., "Adaptive Control of the Reverse Link in cdma2000", International Journal of Wireless Information Networks, vol. 9, No. 1, pp. 55-70 Jan. 2002.

Sarkar S., et al., "cdma2000 Reverse Link: Design and System Performance", 2000 IEEE, vol. 6, pp. 2713-2719, Sep. 24, 2000.

Sunay, M. Oguz, et al.: "Provision of Variable Data Rates in Third Generation Wideband DS CDMA Systems," Wireless Communications and Networking Conference, Sep. 21, 1999, pp. 505-509.

TIA EIA interim Standard IS-856-1, 'CDMA2000 High Rate Packet Data Air Interface Specification, Addendum 1, Jan. 2002, pp. 9-23-9-57, XP002299790.

Taiwanese Search report—093103844—TIPO—Oct. 21, 2010.

3GPP2 C,S0024, Version 2.0: "cdma2000 High Rate Packet Data Air Interface Specification," pp. 1-441 (Oct. 27, 2000).

Adachi, F. et al: "Wideband Multi-rate DS-CDMA for Next Generation Mobile Communications Systems", Wireless Communications Conference (1997). Boulder, CO, USA Aug. 11-13, 1997, NewYork, NY, USA, IEEE, US. Aug. 11, 1997, pp. 57-62, XP010245557, DOI: DOI:10.1109/WCC.1997.622247, ISBN: 978-0-7803-41 94-4.

ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).

Fujii, T. et al., "Best Effort Cell Structure Using Sub-carrier Selected MC-CDMA System," The Institute of Electronics, Information and Communications Engineers, Nov. 15, 2002, vol. 102, No. 465, pp. 65-72, IEICE Technical Report RCS 2002-203 (English Abstract).

Schreiber, W. F: "Spread-Spectrum Television Broadcasting", SMPTE Journal, SMPTE Inc. Scarsdale, N.Y, US, vol. 101, No. 8, Aug. 1, 1992, pp. 538-549, XP000296026, ISSN: 0036-1682.

Sklar, B. "Digital Communications, Fundamentals and Applications", 4 pages, 2001. Prentice-Hall PTR. Upper Saddle River, New Jersey, USA.

TIA/EIA-IS-2000 Release C, "Introduction to cdma2000 Standards for Spread Spectrum Systems, Release C" (3GPP2 C.S0001-C, Version 1.0) May 28, 2002.

Chen, Tau, "Method and Apparatus for Forward Link Power Control During Soft Handoff in a Communication System", U.S. Appl. No. 60/356,929 entitled, filed Feb. 12, 2002, QUALCOMM Incorporated.

Taiwan Search Report—TW093106052—TIPO—Mar. 28, 2011.

Brouwer A E et al:"An Updated Table of Minimum-Distance Bounds for Binary Linear Codes" IEEE Transactions on Information Theory, IEEE Service Center, Piscataway, NJ, US, vol. 39, No. 2, Mar. 1, 1993 pp. 662-677, XP000377724 ISSN: 0018-9448.

MacWilliams F. J.; Sloane N.J.A.:"The Theory of Error-Correcting Codes, pp. 23, 24"1977, North-Holland, Amsterdam, XP002366024.

Morelos-Zaragoza R. H.: "The Art of Error Correcting Coding, pp. 101-120" 2002, John Wiley and Sons, New York, XP002366026.

Morelos-Zaragoza R.H.: "The Art of Error Correcting Coding, pp. 16,35" 2002, John Wiley and Sons, New York, XP002366025.

Strawczynski et al. "Multi User Frame Structure for 1XEV Forward Link," 3GPP2 cdma2000 TSG-C, Nortel Networks, 2000, pp. 1-6.

* cited by examiner

CODE DIVISION MULTIPLEXING COMMANDS ON A CODE DIVISION MULTIPLEXED CHANNEL

CROSS-REFERENCES

The present application claims priority from U.S. provisional application Ser. No. 60/448,269, entitled "REVERSE LINK DATA COMMUNICATION", filed on Feb. 18, 2003; U.S. provisional application Ser. No. 60/452,790, entitled "METHOD AND APPARATUS FOR A REVERSE LINK COMMUNICATION IN A COMMUNICATION SYSTEM", filed on Mar. 6, 2003; U.S. provisional application Ser. No. 60/470,225, entitled "METHOD AND APPARATUS FOR QUALITY OF SERVICE IN IS-2000 REVERSE LINK", filed on May 12, 2003; and U.S. provisional application Ser. No. 60/470,770, entitled "OUTER-LOOP POWER CONTROL FOR REL. D", filed on May 14, 2003

FIELD

The present invention relates generally to wireless communications, and more specifically to a novel and improved method and apparatus for code division multiplexing commands or signals on a code division multiplexed channel.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as power control and soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from the mobile station, very fast scheduling, and scheduling for services that have more relaxed delay requirements. An example of such a data-only communication system using these techniques is the high data rate (HDR) system that conforms to the TIA/EIA/IS-856 standard (the IS-856 standard).

In contrast to the other above named standards, an IS-856 system uses the entire spectrum available in each cell to transmit data to a single user at one time, selected based on link quality. In so doing, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1xEV-DV", submitted to 3GPP2 as document number C50-20010820-012, Aug. 20, 2001. These, and related documents generated subsequently, such as Revision C of the IS-2000 standard, including C.S0001.C through C.S0006.C, are hereinafter referred to as the 1xEV-DV proposal.

In order to coordinate usage of the forward and reverse link in an efficient manner, a system, the 1xEV-DV proposal, for example, may need to direct feedback from a base station to a number of supported mobile stations. It is common for such feedback to be transmitted on one or more control channels. In a CDMA system, such control channels may be multiplexed with other control and/or data channels using Code Division Multiplexing (CDM). Traditionally, to reach a plurality of mobile stations, a control channel is time-shared to transmit to each of the mobile stations. Thus, a control channel may be multiplexed using Time Division Multiplexing (TDM) to incorporate signals or commands for multiple mobile stations. The resultant TDM control channel may then be transmitted along with other channels, whether control, voice, or data, using CDM. One example of such a TDM on CDM channel is the power control channel in cdma2000.

As is well known in wireless system design, when a channel can be transmitted using less power for the same reliability, the capacity of the system may be improved. Thus, there is a need in the art for more efficient control channels. Furthermore, TDM on CDM channels may have peak power requirements that are inefficient, or even unattainable given system design parameters. There is therefore a need in the art for control channels that can reach a plurality of mobile stations, thus allowing for efficient use of the shared communication resource, while meeting peak power design constraints as well as reducing the amount of system capacity allocated to such control.

SUMMARY

Embodiments disclosed herein address the need for efficient signaling to a plurality of mobile stations. In one embodiment, each of a plurality of symbol streams are encoded with one of a plurality of covering sequences, the covered symbol streams are combined to form a Code Division Multiplexed (CDM) signal, and the CDM signal is further covered by another covering sequence for code division multiplexing with one or more additional signals for transmission to a remote station. In another embodiment, a plurality of CDM signals are formed from the covered symbol streams, and the plurality of CDM signals are Time Division Multiplexed (TDM) prior to the further covering. In other embodiments, decovering and demultiplexing is performed to recover one or more of the symbol streams. Various other aspects are also presented. These aspects have the benefit of providing efficient utilization of the reverse link capacity, accommodating varying requirements such as low-latency, high throughput or differing quality of service, and reducing forward and reverse link overhead for providing these benefits, thus avoiding excessive interference and increasing capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
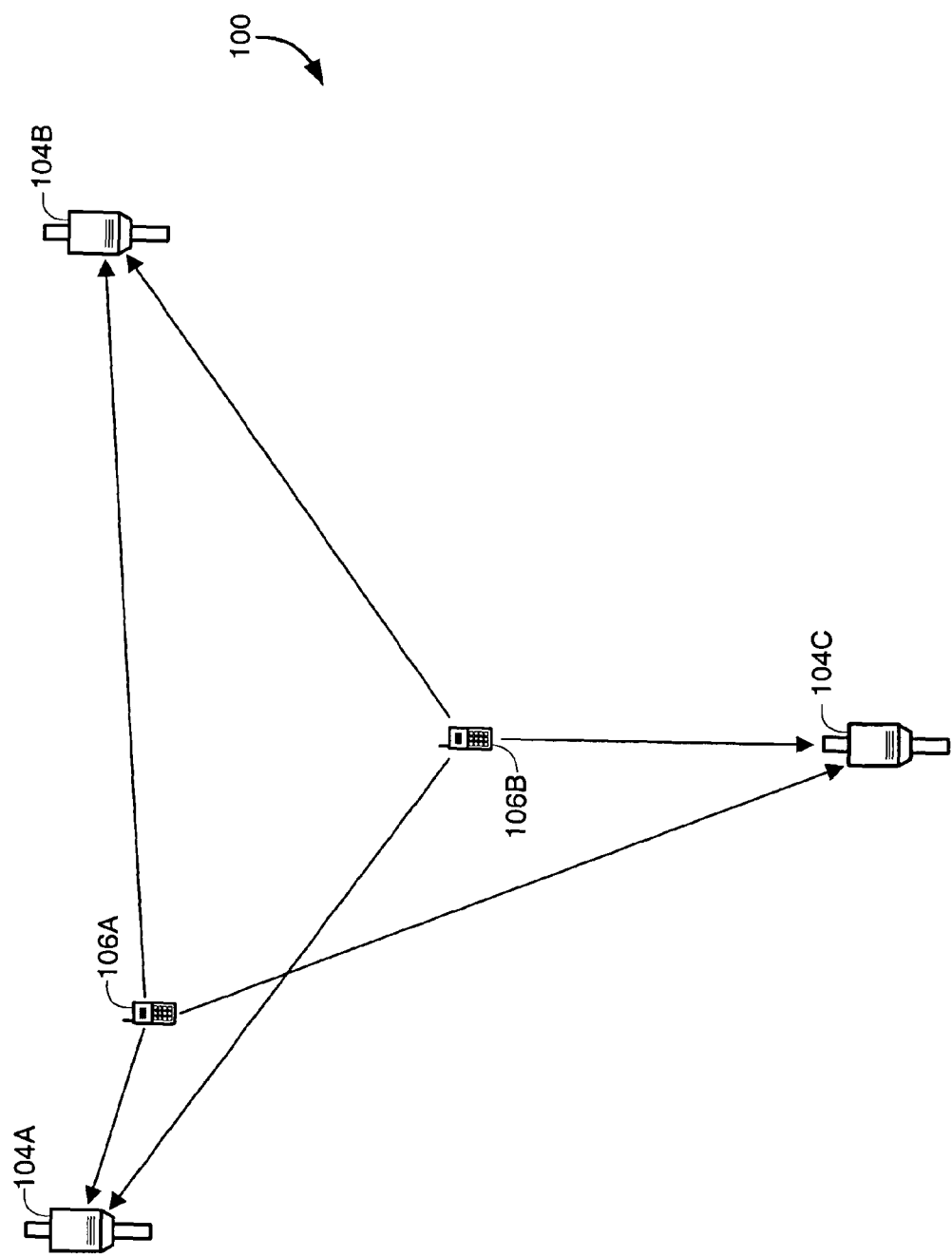
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1xEV-DV proposal). In an alternative embodiment, system 100 may additionally support any wireless standard or design other than a CDMA system. In the exemplary embodiment, system 100 is a 1xEV-DV system.

For simplicity, system 100 is shown to include three base stations 104 in communication with two mobile stations 106. The base station and its coverage area are often collectively referred to as a "cell". In IS-95, cdma2000, or 1xEV-DV systems, for example, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

While the various embodiments described herein are directed to providing reverse-link or forward-link signals for supporting reverse link transmission, and some may be well suited to the nature of reverse link transmission, those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

1xEV-DV Forward Link Data Transmission and Reverse Link Power Control

A system 100, such as the one described in the 1xEV-DV proposal, generally comprises forward link channels of four classes: overhead channels, dynamically varying IS-95 and IS-2000 channels, a Forward Packet Data Channel (F-PDCH), and some spare channels. The overhead channel assignments vary slowly, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services. The F-PDCH may be used for data services that are less sensitive to delay while the IS-2000 channels are used for more delay-sensitive services.

The F-PDCH, similar to the traffic channel in the IS-856 standard, is used to send data at the highest supportable data rate to one user in each cell at a time. In IS-856, the entire power of the base station and the entire space of Walsh functions are available when transmitting data to a mobile station. However, in the proposed 1xEV-DV system, some base station power and some of the Walsh functions are allocated to overhead channels and existing IS-95 and cdma2000 services. The data rate that is supportable depends primarily upon the available power and Walsh codes after the power and Walsh codes for the overhead, IS-95, and IS-2000 channels have been assigned. The data transmitted on the F-PDCH is spread using one or more Walsh codes.

In the 1xEV-DV proposal, the base station generally transmits to one mobile station on the F-PDCH at a time, although many users may be using packet services in a cell. (It is also possible to transmit to two or more users, by scheduling transmissions for the two or more users and allocating power and/or Walsh channels to each user appropriately.) Mobile stations are selected for forward link transmission based upon some scheduling algorithm.

In a system similar to IS-856 or 1xEV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission that supports a relatively higher transmission rate in order to make more efficient use of the shared communication channel. As another example, in a 1xEV-DV system, each mobile station transmits a Carrier-to-Interference (C/I) estimate as the channel quality estimate on the Reverse Channel Quality Indicator Channel or R-CQICH. The scheduling algorithm is used to determine the mobile station selected for transmission, as well as the appropriate rate and transmission format in accordance with the channel quality.

As described above, a wireless communication system 100 may support multiple users sharing the communication resource simultaneously, such as an IS-95 system, may allocate the entire communication resource to one user at time, such as an IS-856 system, or may apportion the communication resource to allow both types of access. A 1xEV-DV system is an example of a system that divides the communication resource between both types of access, and dynamically allocates the apportionment according to user demand. Following is a brief background on how the communication resource can be allocated to accommodate various users in both types of access systems. Power control is described for simultaneous access by multiple users, such as IS-95 type channels. Rate determination and scheduling is discussed for time-shared access by multiple users, such as an IS-856 system or the data-only portion of a 1xEV-DV type system (i.e., the F-PDCH).

Capacity in a system such as an IS-95 CDMA system is determined in part by interference generated in transmitting signals to and from various users within the system. A feature of a typical CDMA system is to encode and modulate signals for transmission to or from a mobile station such that the signals are seen as interference by other mobile stations. For example, on the forward link, the quality of the channel between a base station and one mobile station is determined in part by other user interference. To maintain a desired performance level of communication with the mobile station, the transmit power dedicated to that mobile station must be sufficient to overcome the power transmitted to the other mobile stations served by the base station, as well as other disturbances and degradation experienced in that channel. Thus, to increase capacity, it is desirable to transmit the minimum power required to each mobile station served.

In a typical CDMA system, when multiple mobile stations are transmitting to a base station, it is desirable to receive a plurality of mobile station signals at the base station at a normalized power level. Thus, for example, a reverse link power control system may regulate the transmit power from each mobile station such that signals from nearby mobile stations do not overpower signals from farther away mobile stations. As with the forward link, keeping the transmit power of each mobile station at the minimum power level required to maintain the desired performance level allows for capacity to be optimized, in addition to other benefits of power savings such as increased talk and standby times, reduced battery requirements, and the like.

Capacity in a typical CDMA system, such as IS-95, is constrained by, among other things, other-user interference. Other-user interference can be mitigated through use of power control. The overall performance of the system, including capacity, voice quality, data transmission rates and throughput, is dependant upon stations transmitting at the lowest power level to sustain the desired level of performance whenever possible. To accomplish this, various power control techniques are known in the art.

One class of techniques includes closed loop power control. For example, closed loop power control may be deployed on the forward link. Such systems may employ an inner and outer power control loop in the mobile station. An outer loop determines a target received power level according to a desired received error rate. For example, a target frame error rate of 1% may be pre-determined as the desired error rate. The outer loop may update the target received power level at a relatively slow rate, such as once per frame or block. In response, the inner loop then sends up or down power control messages to the base station until received power meets the target. These inner loop power control commands occur relatively frequently, so as to quickly adapt the transmitted power to the level necessary to achieve the desired received signal to noise and interference ratio for efficient communication. As described above, keeping the forward link transmit power for each mobile station at the lowest level reduces other user interference seen at each mobile station and allows remaining available transmit power to be reserved for other purposes. In a system such as IS-95, the remaining available transmit power can be used to support communication with additional users. In a system such as 1xEV-DV, the remaining available transmit power can be used to support additional users, or to increase the throughput of the data-only portion of the system.

In a "data-only" system, such as IS-856, or in the "data-only" portion of a system, such as 1xEV-DV, a control loop may be deployed to govern the transmission from the base station to a mobile station in a time-shared manner. For clarity, in the following discussion, transmission to one mobile station at a time may be described. This is to distinguish from a simultaneous access system, an example of which is IS-95, or various channels in a cdma200 or 1xEV-DV system. Two notes are in order at this point.

First, the term "data-only" or "data channel" may be used to distinguish a channel from IS-95 type voice or data channels (i.e. simultaneous access channels using power control, as described above) for clarity of discussion only. It will be apparent to those of skill in the art that data-only or data channels described herein can be used to transmit data of any type, including voice (e.g., voice over Internet Protocol, or VOIP). The usefulness of any particular embodiment for a particular type of data may be determined in part by the throughput requirements, latency requirements, and the like. Those of skill in the art will readily adapt various embodiments, combining either access type with parameters selected to provide the desired levels of latency, throughput, quality of service, and the like.

Second, a data-only portion of a system, such as that described for 1xEV-DV, which is described as time-sharing the communication resource, can be adapted to provide access on the forward link to more than one user simultaneously. In examples herein where the communication resource is described as time-shared to provide communication with one mobile station or user during a certain period, those of skill in the art will readily adapt those examples to allow for time-shared transmission to or from more than one mobile station or user within that time period.

A typical data communication system may include one or more channels of various types. More specifically, one or more data channels are commonly deployed. It is also common for one or more control channels to be deployed, although in-band control signaling can be included on a data channel. For example, in a 1xEV-DV system, a Forward Packet Data Control Channel (F-PDCCH) and a Forward Packet Data Channel (F-PDCH) are defined for transmission of control and data, respectively, on the forward link.

Figure 2:
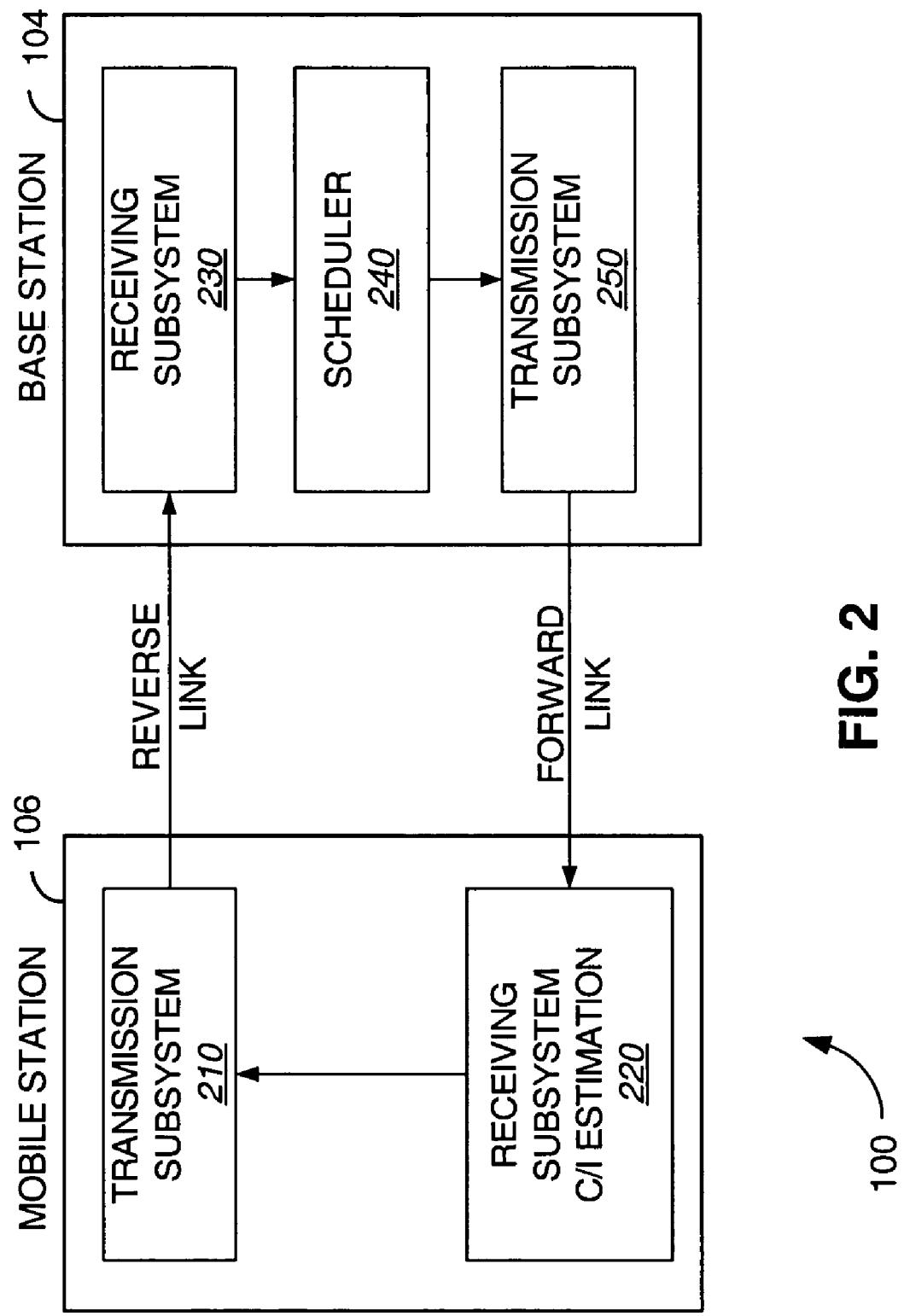
FIG. 2 depicts an example mobile station and base station configured in a system adapted for data communication.

FIG. 2 depicts an example mobile station 106 and base station 104 configured in a system 100 adapted for data communication. Base station 104 and mobile station 106 are shown communicating on a forward and a reverse link. Mobile station 106 receives forward link signals in receiving subsystem 220. A base station 104 communicating the forward data and control channels, detailed below, may be referred to herein as the serving station for the mobile station 106. An example receiving subsystem is detailed further below with respect to FIG. 3. A Carrier-to-Interference (C/I) estimate is made for the forward link signal received from the serving base station in the mobile station 106. A C/I measurement is an example of a channel quality metric used as a channel estimate, and alternate channel quality metrics can be deployed in alternate embodiments. The C/I measurement is delivered to transmission subsystem 210 in the base station 104, an example of which is detailed further below with respect to FIG. 3.

The transmission subsystem 210 delivers the C/I estimate over the reverse link where it is delivered to the serving base station. Note that, in a soft handoff situation, well known in the art, the reverse link signals transmitted from a mobile station may be received by one or more base stations other than the serving base station, referred to herein as non-serving base stations. Receiving subsystem 230, in base station 104, receives the C/I information from mobile station 106.

Scheduler 240, in base station 104, is used to determine whether and how data should be transmitted to one or more mobile stations within the serving cell's coverage area. Any type of scheduling algorithm can be deployed within the scope of the present invention. One example is disclosed in U.S. patent application Ser. No. 08/798,951, entitled "METHOD AND APPARATUS FOR FORWARD LINK RATE SCHEDULING", filed Feb. 11, 1997, assigned to the assignee of the present invention, incorporated by reference herein.

In an example 1xEV-DV embodiment, a mobile station is selected for forward link transmission when the C/I measurement received from that mobile station indicates that data can be transmitted at a certain rate. It is advantageous, in terms of system capacity, to select a target mobile station such that the shared communication resource is always utilized at its maximum supportable rate. Thus, the typical target mobile station selected may be the one with the greatest reported C/I. Other factors may also be incorporated in a scheduling decision. For example, minimum quality of service guarantees may have been made to various users. It may be that a mobile station, with a relatively lower reported C/I, is selected for transmission to maintain a minimum data transfer rate to that user.

In the example 1xEV-DV system, scheduler 240 determines which mobile station to transmit to, and also the data rate, modulation format, and power level for that transmission. In an alternate embodiment, such as an IS-856 system, for example, a supportable rate/modulation format decision can be made at the mobile station, based on channel quality measured at the mobile station, and the transmit format can be transmitted to the serving base station in lieu of the C/I measurement. Those of skill in the art will recognize myriad combinations of supportable rates, modulation formats, power levels, and the like which can be deployed within the scope of the present invention. Furthermore, although in various embodiments described herein the scheduling tasks are performed in the base station, in alternate embodiments, some or all of the scheduling process may take place in the mobile station.

Scheduler 240 directs transmission subsystem 250 to transmit to the selected mobile station on the forward link using the selected rate, modulation format, power level, and the like.

In the example embodiment, messages on the control channel, or F-PDCCH, are transmitted along with data on the data channel, or F-PDCH. The control channel can be used to identify the recipient mobile station of the data on the F-PDCH, as well as identifying other communication parameters useful during the communication session. A mobile station should receive and demodulate data from the F-PDCH when the F-PDCCH indicates that mobile station is the target of the transmission. The mobile station responds on the reverse link following the receipt of such data with a message indicating the success or failure of the transmission. Retransmission techniques, well known in the art, are commonly deployed in data communication systems.

A mobile station may be in communication with more than one base station, a condition known as soft handoff. Soft handoff may include multiple sectors from one base station (or one Base Transceiver Subsystem (BTS)), known as softer handoff, as well as with sectors from multiple BTSs. Base station sectors in soft handoff are generally stored in a mobile station's Active Set. In a simultaneously shared communication resource system, such as IS-95, IS-2000, or the corresponding portion of a 1xEV-DV system, the mobile station may combine forward link signals transmitted from all the sectors in the Active Set. In a data-only system, such as IS-856, or the corresponding portion of a 1xEV-DV system, a mobile station receives a forward link data signal from one base station in the Active Set, the serving base station (determined according to a mobile station selection algorithm, such as those described in the C.S0002.C standard). Other forward link signals, examples of which are detailed further below, may also be received from non-serving base stations.

Reverse link signals from the mobile station may be received at multiple base stations, and the quality of the reverse link is generally maintained for the base stations in the active set. It is possible for reverse link signals received at multiple base stations to be combined. In general, soft combining reverse link signals from non-collocated base stations would require significant network communication bandwidth with very little delay, and so the example systems listed above do not support it. In softer handoff, reverse link signals received at multiple sectors in a single BTS can be combined without network signaling. While any type of reverse link signal combining may be deployed within the scope of the present invention, in the example systems described above, reverse link power control maintains quality such that reverse link frames are successfully decoded at one BTS (switching diversity).

In a simultaneously shared communication resource system, such as IS-95, IS-2000, or the corresponding portion of a 1xEV-DV system, each base station in soft handoff with a mobile station (i.e., in the mobile station's Active Set) measures the reverse link pilot quality of that mobile station and sends out a stream of power control commands. In IS-95 or IS-2000 Rev. B, each stream is punctured onto the Forward Fundamental Channel (F-FCH) or the Forward Dedicated Control Channel (F-DCCH), if either is assigned. The stream of commands for a mobile station is called the Forward Power Control Subchannel (F-PCSCH) for that mobile station. The mobile station receives the parallel command streams from all its Active Set members for each base station (multiple sectors from one BTS, if all in the Active Set of the mobile station, send the same command to that mobile station) and determines if an "up" or "down" command was sent. The mobile station modifies the reverse link transmit power level accordingly, using the "Or-of-downs" rule, that is, the transmit power level is reduced if any "down" command is received, and increased otherwise.

The transmit power level of the F-PCSCH is typically tied to the level of the host F-FCH or F-DCCH that carries the subchannel. The host F-FCH or F-DCCH transmit power level at the base station is determined by the feedback from the mobile station on the Reverse Power Control Subchannel (R-PCSCH), which occupies the last quarter of the Reverse Pilot Channel (R-PICH). Since the F-FCH or the F-DCCH from each base station forms a single stream of traffic channel frames, the R-PCSCH reports the combined decoding results of these legs. Erasures of the F-FCH or the F-DCCH determine the required Eb/Nt set point of the outer loop, which in turn drives the inner loop commands on the R-PCSCH and thus the base station transmit levels of the F-FCH, F-DCCH, as well as the F-PCSCH on them.

Due to the potential differences in reverse link path loss to each base station from a single mobile station in soft handoff, some of the base stations in the Active Set may not receive the R-PCSCH reliably and may not correctly control the forward link power of the F-FCH, F-DCCH, and the F-PCSCH. The base stations may need to re-align the transmit levels among themselves so that the mobile station retains the spatial diversity gain of soft handoff. Otherwise, some of the forward link legs may carry little or no traffic signal energy due to errors in the feedback from the mobile station.

Since different base stations may need different mobile station transmit power for the same reverse link set point or reception quality, the power control commands from different base stations may be different and cannot be soft combined at the MS. When new members are added to the Active Set (i.e. no soft handoff to 1-way soft handoff, or from 1-way to 2-way, etc.), the F-PCSCH transmit power is increased relative to its host F-FCH or F-DCCH. This may be because the latter has both more spatial diversity (less total Eb/Nt required) and load sharing (less energy per leg) while the former has none.

By contrast, in a 1xEV-DV system, the Forward Common Power Control Channel (F-CPCCH) transports the reverse link power control commands for mobile stations without the Forward Fundamental Channel (F-FCH) or the Forward Dedicated Control Channel (F-DCCH). In earlier versions of the 1xEV-DV proposal, it has been assumed that the base station transmit power level of the F-CPCCH is determined by the Reverse Channel Quality Indicator Channel (R-CQICH) received from the mobile station. The R-CQICH may be used in scheduling, to determine the appropriate forward link transmission format and rate in response to forward link channel quality measurements.

However, when the mobile station is in soft handoff, the R-CQICH only reports the forward link pilot quality of the serving base station sector and therefore cannot be used to directly power control the F-CPCCH from the non-serving base stations. Techniques for this are disclosed in U.S. patent application No. 60/356,929, entitled "Method and Apparatus for Forward Link Power Control During Soft Handoff in a Communication System", filed Feb. 12, 2002, assigned to the assignee of the present invention, incorporated by reference herein.

Example Base Station and Mobile Station Embodiments

Figure 3:
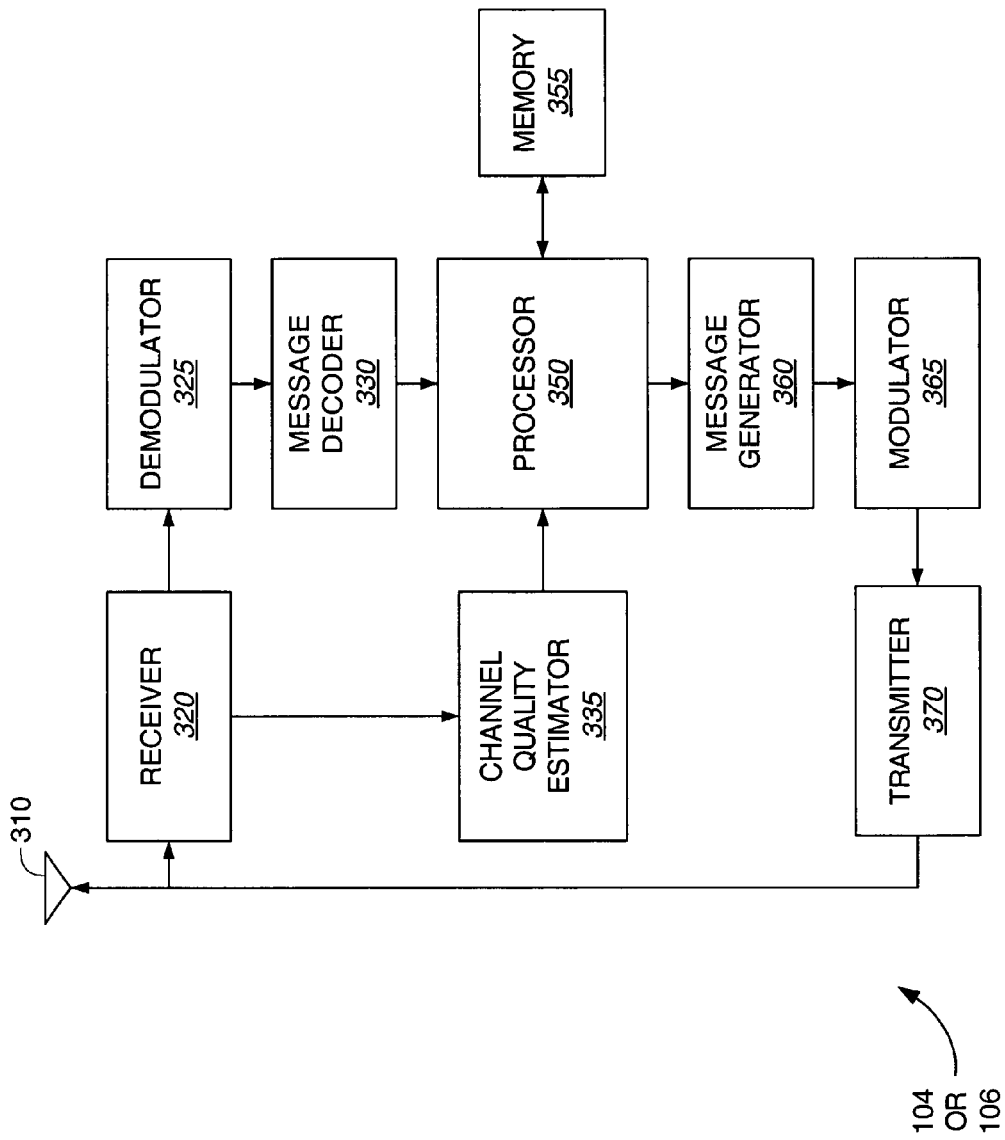
FIG. 3 is a block diagram of a wireless communication device, such as a mobile station or base station.

FIG. 3 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 3 for use in any number of base station or mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may be used to measure channel quality of the forward or reverse link, when the device is a mobile station or base station, respectively, although a separate channel quality estimator 335 is shown for clarity of discussion, detailed below.

Signals from receiver 320 are demodulated in demodulator 325 according to one or more communication standards. In an example embodiment, a demodulator capable of demodulating 1xEV-DV signals is deployed. In alternate embodiments, alternate standards may be supported, and embodiments may support multiple communication formats. Demodulator 330 may perform RAKE receiving, equalization, combining, deinterleaving, decoding, and various other functions as required by the format of the received signals. Various demodulation techniques are known in the art. In a base station 104, demodulator 325 will demodulate according to the reverse link. In a mobile station 106, demodulator 325 will demodulate according to the forward link. Both the data and control channels described herein are examples of channels that can be received and demodulated in receiver 320 and demodulator 325. Demodulation of the forward data channel will occur in accordance with signaling on the control channel, as described above. In various example embodiments described below, demodulator 325 may include one or more despreaders for decoding CDM signals that have been covered by a covering sequence. Demodulator 325 may also include demultiplexers for demultiplexing TDM signals.

Message decoder 330 receives demodulated data and extracts signals or messages directed to the mobile station 106 or base station 104 on the forward or reverse links, respectively. Message decoder 330 decodes various messages used in setting up, maintaining and tearing down a call (including voice or data sessions) on a system. Messages may include channel quality indications, such as C/I measurements, power control messages, or control channel messages used for demodulating the forward data channel. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion. Alternatively, demodulator 325 may decode certain information and send it directly to processor 350 (a single bit message such as an ACK/NAK or a power control up/down command are examples). An example command signal, the Forward Common Acknowledgement Channel (F-CACKCH) is used to describe various embodiments below.

Channel quality estimator 335 is connected to receiver 320, and used for making various power level estimates for use in procedures described herein, as well as for use in various other processing used in communication, such as demodulation. In a mobile station 106, C/I measurements may be made. In addition, measurements of any signal or channel used in the system may be measured in the channel quality estimator 335 of a given embodiment. As described more fully below, power control channels are another example. In a base station 104 or mobile station 106, signal strength estimations, such as received pilot power can be made. Channel quality estimator 335 is shown as a discrete block for clarity of discussion only. It is common for such a block to be incorporated within another block, such as receiver 320 or demodulator 325. Various types of signal strength estimates can be made, depending on which signal or which system type is being estimated. In general, any type of channel quality metric estimation block can be deployed in place of channel quality estimator 335 within the scope of the present invention. In a base station 104, the channel quality estimates are delivered to processor 350 for use in scheduling, or determining the reverse link quality, as described further below. Channel quality estimates may be used to determine whether up or down power control commands are required to drive either the forward or reverse link power to the desired set point. The desired set point may be determined with an outer loop power control mechanism, as described above.

Signals are transmitted via antenna 310. Transmitted signals are formatted in transmitter 370 according to one or more wireless system standards, such as those listed above. Examples of components that may be included in transmitter 370 are amplifiers, filters, digital-to-analog (D/A) converters, radio frequency (RF) converters, and the like. Data for transmission is provided to transmitter 370 by modulator 365. Data and control channels can be formatted for transmission in accordance with a variety of formats. Data for transmission on the forward link data channel may be formatted in modulator 365 according to a rate and modulation format indicated by a scheduling algorithm in accordance with a C/I or other channel quality measurement. A scheduler, such as scheduler 240, described above, may reside in processor 350. Similarly, transmitter 370 may be directed to transmit at a power level in accordance with the scheduling algorithm. Examples of components which may be incorporated in modulator 365 include encoders, interleavers, spreaders, and modulators of various types. CDM and TDM encoders are described in various embodiments, below. A reverse link design, including example modulation formats and access control, suitable for deployment on a 1xEV-DV system is also described below, Message generator 360 may be used to prepare messages of various types, as described herein. For example, C/I messages may be generated in a mobile station for transmission on the reverse link. Various types of control messages may be generated in either a base station 104 or mobile station 106 for transmission on the forward or reverse links, respectively. For example, described below are request messages and grant messages for scheduling reverse link data transmission for generation in a mobile station or base station, respectively.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, channel quality estimator 335, message generator 360, modulator 365, or transmitter 370, as well as any other processing required by the wireless communication device. Processor 350 may be connected with special-purpose hardware to assist in these tasks (details not shown). Data or voice applications may be external, such as an externally connected laptop computer or connection to a network, may run on an additional processor within wireless communication device 104 or 106 (not shown), or may run on processor 350 itself. Processor 350 is connected with memory 355, which can be used for storing data as well as instructions for performing the various procedures and methods described herein. Those of skill in the art will recognize that memory 355 may be comprised of one or more memory components of various types, that may be embedded in whole or in part within processor 350.

1xEV-DV Reverse Link Design Considerations

In this section, various factors considered in the design of an example embodiment of a reverse link of a wireless communication system are described. In many of the embodiments, detailed further in following sections, signals, parameters, and procedures associated with the 1xEV-DV standard are used. This standard is described for illustrative purposes only, as each of the aspects described herein, and combinations thereof, may be applied to any number of communication systems within the scope of the present invention. This section serves as a partial summary of various aspects of the invention, although it is not exhaustive. Example embodiments are detailed further in subsequent sections below, in which additional aspects are described.

In many cases, reverse link capacity is interference limited. Base stations allocate available reverse link communication resources to mobile stations for efficient utilization to maximize throughput in accordance with Quality of Service (QoS) requirements for the various mobile stations.

Maximizing the use of the reverse link communication resource involves several factors. One factor to consider is the mix of scheduled reverse link transmissions from various mobile stations, each of which may be experiencing varying channel quality at any given time. To increase overall throughput (the aggregate data transmitted by all the mobile stations in the cell), it is desirable for the entire reverse link to be fully utilized whenever there is reverse link data to be sent. To fill the available capacity, mobile stations may be granted access at the highest rate they can support, and additional mobile stations may be granted access until capacity is reached. One factor a base station may consider in deciding which mobile stations to schedule is the maximum rate each mobile can support and the amount of data each mobile station has to send. A mobile station capable of higher throughput may be selected instead of an alternate mobile station whose channel does not support the higher throughput.

Another factor to be considered is the quality of service required by each mobile station. While it may be permissible to delay access to one mobile station in hopes that the channel will improve, opting instead to select a better situated mobile station, it may be that suboptimal mobile stations may need to be granted access to meet minimum quality of service guarantees. Thus, the data throughput scheduled may not be the absolute maximum, but rather maximized considering channel conditions, available mobile station transmit power, and service requirements. It is desirable for any configuration to reduce the signal to noise ratio for the selected mix.

Various scheduling mechanisms are described below for allowing a mobile station to transmit data on the reverse link. One class of reverse link transmission involves the mobile station making a request to transmit on the reverse link. The base station makes a determination of whether resources are available to accommodate the request. A grant can be made to allow the transmission. This handshake between the mobile station and the base station introduces a delay before the reverse link data can be transmitted. For certain classes of reverse link data, the delay may be acceptable. Other classes may be more delay-sensitive, and alternate techniques for reverse link transmission are detailed below to mitigate delay.

In addition, reverse link resources are expended to make a request for transmission, and forward link resources are expended to respond to the request, i.e. transmit a grant. When a mobile station's channel quality is low, i.e. low geometry or deep fading, the power required on the forward link to reach the mobile may be relatively high. Various techniques are detailed below to reduce the number or required transmit power of requests and grants required for reverse link data transmission.

To avoid the delay introduced by a request/grant handshake, as well as to conserve the forward and reverse link resources required to support them, an autonomous reverse link transmission mode is supported. A mobile station may transmit data at a limited rate on the reverse link without making a request or waiting for a grant.

The base station allocates a portion of the reverse link capacity to one or more mobile stations. A mobile station that is granted access is afforded a maximum power level. In the example embodiments described herein, the reverse link resource is allocated using a Traffic to Pilot (T/P) ratio. Since the pilot signal of each mobile station is adaptively controlled via power control, specifying the T/P ratio indicates the available power for use in transmitting data on the reverse link. The base station may make specific grants to one or more mobile stations, indicating a T/P value specific to each mobile station. The base station may also make a common grant to the remaining mobile stations which have requested access, indicating a maximum T/P value that is allowed for those remaining mobile stations to transmit. Autonomous and scheduled transmission, as well as individual and common grants, are detailed further below.

Various scheduling algorithms are known in the art, and more are yet to be developed, which can be used to determine the various specific and common T/P values for grants in accordance with the number of registered mobile stations, the probability of autonomous transmission by the mobile stations, the number and size of the outstanding requests, expected average response to grants, and any number of other factors. In one example, a selection is made based on QoS priority, efficiency, and the achievable throughput from the set of requesting mobile stations. One example scheduling technique is disclosed in co-pending provisional U.S. patent application Ser. No. 60/439,989, entitled "SYSTEM AND METHOD FOR A TIME-SCALABLE PRIORITY-BASED SCHEDULER", filed Jan. 13, 2003, assigned to the assignee of the present invention, incorporated by reference herein. Additional references include U.S. Pat. No. 5,914,950, entitled "METHOD AND APPARATUS FOR REVERSE LINK RATE SCHEDULING", and U.S. Pat. No. 5,923,650, also entitled "METHOD AND APPARATUS FOR REVERSE LINK RATE SCHEDULING", both assigned to the assignee of the present invention, incorporated by reference herein.

A mobile station may transmit a packet of data using one or more subpackets, where each subpacket contains the complete packet information (each subpacket is not necessarily encoded identically, as various encoding or redundancy may be deployed throughout various subpackets). Retransmission techniques may be deployed to ensure reliable transmission, for example ARQ. Thus, if the first subpacket is received without error (using a CRC, for example), a positive Acknowledgement (ACK) is sent to the mobile station and no additional subpackets will be sent (recall that each subpacket comprises the entire packet information, in one form or another). If the first subpacket is not received correctly, then a Negative Acknowledgement signal (NAK) is sent to the mobile station, and the second subpacket will be transmitted. The base station can combine the energy of the two subpackets and attempt to decode. The process may be repeated indefinitely, although it is common to specify a maximum number of subpackets. In example embodiments described herein, up to four subpackets may be transmitted. Thus, the probability of correct reception increases as additional subpackets are received. (Note that a third response from a base station, ACK-and-Continue, is useful for reducing request/grant overhead. This option is detailed further below).

As just described, a mobile station may trade off throughput for latency in deciding whether to use autonomous transfer to transmit data with low latency or requesting a higher rate transfer and waiting for a common or specific grant. In addition, for a given T/P, the mobile station may select a data rate to suit latency or throughput. For example, a mobile station with relatively few bits for transmission may decide that low latency is desirable. For the available T/P (probably the autonomous transmission maximum in this example, but could also be the specific or common grant T/P), the mobile station may select a rate and modulation format such that the probability of the base station correctly receiving the first subpacket is high. Although retransmission will be available if necessary, it is likely that this mobile station will be able to transmit its data bits in one subpacket. In the example embodiments described herein, each subpacket is transmitted in 5 ms. Therefore, in this example, a mobile station may make an immediate autonomous transfer that is likely to be received at the base station following a 5 ms interval. Note that, alternatively, the mobile station may use the availability of additional subpackets to increase the amount of data transmitted for a given T/P. So, a mobile station may select autonomous transfer to reduce latency associated with requests and grants, and may additionally trade the throughput for a particular T/P to minimize the number of subpackets (hence latency) required. Even if the full number of subpackets is selected, autonomous transfer will be lower latency than request and grant for relatively small data transfers. Those of skill in the art will recognize that as the amount of data to be transmitted grows, requiring multiple packets for transmission, the overall latency may be reduced by switching to a request and grant format, since the penalty of the request and grant will eventually be offset by the increased throughput of a higher data rate across multiple packets. This process is detailed further below, with an example set of transmission rates and formats that can be associated with various T/P assignments.

Mobile stations in varying locations within the cell, and traveling at varying speeds will experience varying channel conditions. Power control is used to maintain reverse link signals. Pilot power received at base station may be power controlled to be approximately equal from various mobile stations. Then, as described above, the T/P ratio is an indicator of the amount of the communication resource used during reverse link transmission. It is desirable to maintain the proper balance between pilot and traffic, for a given mobile station transmit power, transmission rate, and modulation format.

Reverse Link Data Transmission

The reverse link is generally quite different than the forward link. Following are several reasons: On the forward link, it takes additional power to transmit from multiple cells—on the reverse link, receiving from more cells reduces the required amount of transmit power. On the reverse link, there are always multiple antennas receiving the mobile station. This can mitigate some of the dramatic fading as often occurs on the forward link.

When the mobile station is in a boundary area between multiple cells, the forward link Ec/Io will dramatically change due to the fading of the other cells. On the reverse link, the change in interference is not as dramatic, since any change is due to a variation in the sum of the received power of all mobile stations that are transmitting on the reverse link all of which are all power controlled.

The mobile station is power limited on the reverse link. Thus, the mobile station may be unable to transmit at a very high rate from time to time, depending on channel conditions.

The mobile station may not be able to receive the forward link from the base station that received the mobile station's reverse link transmission. As a result, if the mobile station relies upon the transmission of signaling, for example, an acknowledgement, from a single base station, then that signalling reliability may be low.

One goal of a reverse link design is to maintain the Rise-over-Thermal (RoT) at the base station relatively constant as long as there is reverse link data to be transmitted. Transmission on the reverse link data channel is handled in two different modes:

Autonomous Transmission: This case is used for traffic requiring low delay. The mobile station is allowed to transmit immediately, up to a certain transmission rate, determined by the serving base station (i.e. the base station to which the mobile station directs its Channel Quality Indicator (CQI). A serving base station is also referred to as a scheduling base station or a granting base station. The maximum allowed transmission rate for autonomous transmission can be signaled by the serving base station dynamically based on system load, congestion, etc.

Scheduled Transmission: The mobile station sends an estimate of its buffer size, available power, and other parameters. The base station determines when the mobile station is allowed to transmit. The goal of a scheduler is to limit the number of simultaneous transmissions, thus reducing the interference between mobile stations. The scheduler may attempt to have mobile stations in regions between cells transmit at lower rates so as to reduce interference to neighboring cells, and to tightly control RoT to protect the voice quality on the R-FCH, the DV feedback on R-CQICH and the acknowledgments (R-ACKCH), as well as the stability of the system.

Various embodiments, detailed herein, contain one or more features designed to improve throughput, capacity, and overall system performance of the reverse link of a wireless communication system. For illustrative purposes only, the data portion of a 1xEV-DV system, in particular, optimization of transmission by various mobile stations on the Enhanced Reverse Supplemental Channel (R-ESCH), is described. Various forward and reverse link channels used in one or more of the example embodiments are detailed in this section. These channels are generally a subset of the channels used in a communication system.

Figure 4:
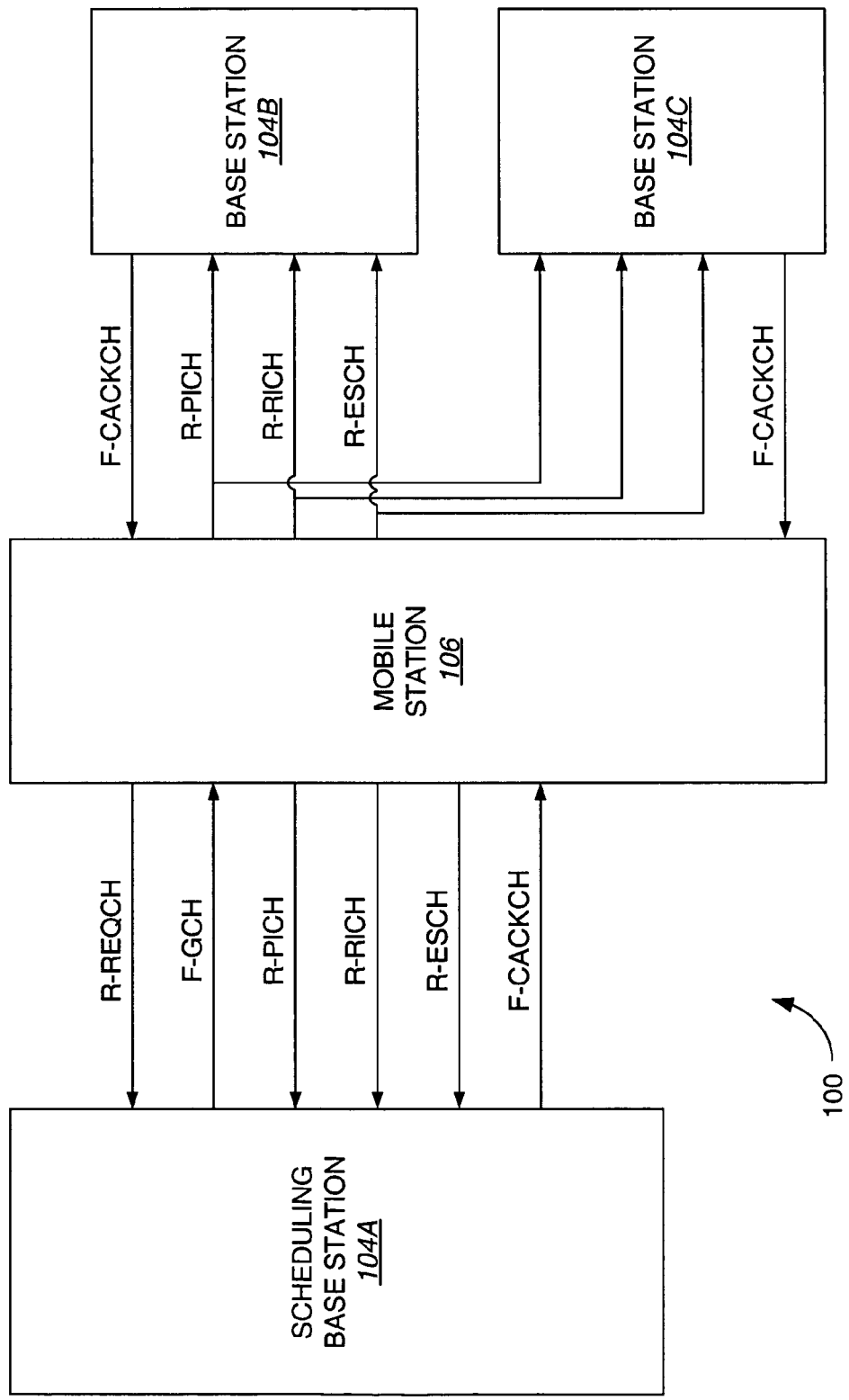
FIG. 4 depicts an exemplary embodiment of data and control signals for reverse link data communication.

FIG. 4 depicts an exemplary embodiment of data and control signals for reverse link data communication. A mobile station 106 is shown communicating over various channels, each channel connected to one or more base stations 104A-104C. Base station 104A is labeled as the scheduling base station. The other base stations 104B and 104C are part of the Active Set of mobile station 106. There are four types of reverse link signals and two types of forward link signals shown. They are described below.

R-REQCH

The Reverse Request Channel (R-REQCH) is used by the mobile station to request from the scheduling base station a reverse link transmission of data. In the example embodiment, requests are for transmission on the R-ESCH (detailed further below). In the example embodiment, a request on the R-REQCH includes the T/P ratio the mobile station can support, variable according to changing channel conditions, and the buffer size (i.e. the amount of data awaiting transmission).

The request may also specify the Quality of Service (QoS) for the data awaiting transmission. Note that a mobile station may have a single QoS level specified for the mobile station, or, alternately, different QoS levels for different types of data. Higher layer protocols may indicate the QoS, or other desired parameters (such as latency or throughput requirements) for various data services. In an alternative embodiment, a Reverse Dedicated Control Channel (R-DCCH), used in conjunction with other reverse link signals, such as the Reverse Fundamental Channel (R-FCH) (used for voice services, for example), may be used to carry access requests. In general, access requests may be described as comprising a logical channel, i.e. a Reverse Schedule Request Channel (R-SRCH), which may be mapped onto any existing physical channel, such as the R-DCCH. The example embodiment is backward compatible with existing cdma2000 systems such as cdma2000, and the R-REQCH is a physical channel that can be deployed in the absence of either the R-FCH or the R-DCCH. For clarity, the term R-REQCH is used to describe the access request channel in embodiment descriptions herein, although those of skill in the art will readily extend the principles to any type of access request system, whether the access request channel is logical or physical. The R-REQCH may be gated off until a request is needed, thus reducing interference and conserving system capacity.

In the example embodiment, the R-REQCH has 12 input bits, that consist of the following: 4 bits to specify the maximum R-ESCH T/P ratio that the mobile can support, 4 bits to specify the amount of data in the mobile's buffer, and 4 bits to specify the QoS. Those of skill in the art will recognize that any number of bits and various other fields may be included in alternate embodiments.

F-GCH

The Forward Grant Channel (F-GCH) is transmitted from the scheduling base station to the mobile station. The F-GCH may be comprised of multiple channels. In the example embodiment, a common F-GCH channel is deployed for making common grants, and one or more individual F-GCH channels are deployed for making individual grants. Grants are made by the scheduling base station in response to one or more requests from one or more mobile stations on their respective R-REQCHs. Grant channels may be labeled as $GCH_x$, where the subscript x identifies the channel number. A channel number 0 may be used to indicate the common grant channel. If N individual channels are deployed, the subscript x may range from 1 to N.

An individual grant may be made to one or more mobile stations, each of which gives permission to the identified mobile station to transmit on the R-ESCH at a specified T/P ratio or below. Making grants on the forward link will naturally introduce overhead that uses some forward link capacity. Various options for mitigating the overhead associated with grants are detailed herein, and other options will be apparent to those of skill in the art in light of the teachings herein.

One consideration is that mobile stations will be situated such that each experiences varying channel quality. Thus, for example, a high geometry mobile station with a good forward and reverse link channel may need a relatively low power for grant signal, and is likely to be able to take advantage of a high data rate, and hence is desirable for an individual grant. A low geometry mobile station, or one experiencing deeper fading, may require significantly more power to receive an individual grant reliably. Such a mobile station may not be the best candidate for an individual grant. A common grant for this mobile station, detailed below, may be less costly in forward link overhead.

In the example embodiment, a number of individual F-GCH channels are deployed to provide the corresponding number of individual grants at a particular time. The F-GCH channels are code division multiplexed. This facilitates the ability to transmit each grant at the power level required to reach just the specific intended mobile station. In an alternative embodiment, a single individual grant channel may be deployed, with the number of individual grants time multiplexed. To vary the power of each grant on a time multiplexed individual F-GCH may introduce additional complexity. Any signaling technique for delivering common or individual grants may be deployed within the scope of the present invention.

In some embodiments, a relatively large number of individual grant channels (i.e. F-GCHs) are deployed, it may be deployed to allow for a relatively large number of individual grants at one time. In such a case, it may be desirable to limit the number of individual grant channels each mobile station has to monitor. In one example embodiment, various subsets of the total number of individual grant channels are defined. Each mobile station is assigned a subset of individual grant channels to monitor. This allows the mobile station to reduce processing complexity, and correspondingly reduce power consumption. The tradeoff is in scheduling flexibility, since the scheduling base station may not be able to arbitrarily assign sets of individual grants (e.g., all individual grants can not be made to members of a single group, since those members, by design, do not monitor one or more of the individual grant channels). Note that this loss of flexibility does not necessarily result in a loss of capacity. For illustration, consider and example including four individual grant channels. The even numbered mobile stations may be assigned to monitor the first two grant channels, and the odd numbered mobile stations may be assigned to monitor the last two. In another example, the subsets may overlap, such as the even mobile stations monitoring the first three grant channels, and the odd mobile stations monitoring the last three grant channels. It is clear that the scheduling base station can not arbitrarily assign four mobile stations from any one group (even or odd). These examples are illustrative only. Any number of channels with any configuration of subsets may be deployed within the scope of the present invention.

The remaining mobile stations, having made a request, but not receiving an individual grant, may be given permission to transmit on the R-ESCH using a common grant, which specifies a maximum T/P ratio that each of the remaining mobile stations must adhere to. The common F-GCH may also be referred to as the Forward Common Grant Channel (F-CGCH). A mobile station monitors the one or more individual grant channels (or a subset thereof) as well as the common F-GCH. Unless given an individual grant, the mobile station may transmit if a common grant is issued. The common grant indicates the maximum T/P ratio at which the remaining mobile stations (the common grant mobile stations) may transmit for the data with certain type of QoS In the example embodiment, each common grant is valid for a number of subpacket transmission intervals. Once receiving a common grant, a mobile station who has sent a request but doesn't get an individual grant may start to transmit one or more encoder packets within the subsequent transmission intervals. The grant information can be repeated multiple times. This allows the common grant to be transmitted at a reduced power level with respect to an individual grant. Each mobile station may combine the energy from multiple transmissions to reliably decode the common grant. Therefore, a common grant may be selected for mobile stations with low-geometry, for example, where an individual grant is deemed too costly in terms of forward link capacity. However, common grants still require overhead, and various techniques for reducing this overhead are detailed below.

R-PICH

The Reverse Pilot Channel (R-PICH) is transmitted from the mobile station to the base stations in the Active Set. The power in the R-PICH may be measured at one or more base stations for use in reverse link power control. As is well known in the art, pilot signals may be used to provide amplitude and phase measurements for use in coherent demodulation. As described above, the amount of transmit power available to the mobile station (whether limited by the scheduling base station or the inherent limitations of the mobile station's power amplifier) is split among the pilot channel, traffic channel or channels, and control channels.

As described above, additional pilot power may be needed for higher data rates and modulation formats. To simplify the use of the R-PICH for power control, and to avoid some of the problems associated with instantaneous changes in required pilot power, an additional channel may be allocated for use as a supplemental or secondary pilot. Although, generally, pilot signals are transmitted using known data sequences, as disclosed herein, an information bearing signal may also be deployed for use in generating reference information for demodulation. In the example embodiment, the R-RICH (detailed below) is used to carry the additional pilot power desired.

R-RICH

The Reverse Rate Indicator Channel (R-RICH) is used by the mobile station to indicate the transmission format on the reverse traffic channel, R-ESCH. The R-RICH 5-bit message is a set of 5-bits of value 1 or 0. The orthogonal encoder block maps each 5-bit input sequence into a 32-symbol orthogonal sequence. For example each 5-bit input sequence could be mapped to a different Walsh code of length 32. The sequence repetition block repeats the sequence of 32 input symbols three times. The bit repetition block provides at its output the input bit repeated 96 times. The sequence selector block selects between the two inputs, and passes that input to the output. For zero rates, the output of the bit repetition block is passed through. For all other rates, the output of the sequence repetition block is passed through. The signal point mapping block maps an input bit 0 to +1, and an input 1 to −1. Following the signal point mapping block is a Walsh spreading block. The Walsh spreading block spreads each input symbol to 64 chips. Each input symbols multiplies a Walsh code W(48, 64). A Walsh code W(48,64) is the Walsh code of length 64 chips, and index 48. TIA/EIA IS-2000 provides tables describing Walsh codes of various lengths.

Those of skill in the art will recognize that the channel structure is for example only. Various other encoding, repetition, interleaving, signal point mapping, or Walsh encoding parameters could be deployed in alternate embodiments. Additional encoding or formatting techniques, well known in the art, may also be deployed. These modifications fall within the scope of the present invention.

R-ESCH

The Enhanced Reverse Supplemental Channel (R-ESCH) is used as the reverse link traffic data channel in the example embodiments described herein. Any number of transmission rates and modulation formats may be deployed for the R-ESCH. In an example embodiment, the R-ESCH has the following properties: Physical layer retransmissions are supported. For retransmissions when the first code is a Rate 1/4 code, the retransmission uses a Rate 1/4 code and Chase combining is used. For retransmissions when the first code is a rate greater than 1/4, incremental redundancy is used. The underlying code is a Rate 1/5 code. Alternatively, incremental redundancy could also be used for all the cases.

ward Grant Channel. The mobile station may use a lower T/P if it is running out of power to transmit, letting HARQ meet the required QoS. Layer 3 signaling messages may also be transmitted over the R-ESCH, allowing the system to operate without the FCH/DCCH.

TABLE 1

Enhanced Reverse Supplemental Channel Parameters

| Number of Bits per Encoder Packet | Number of 5-ms Slots | Data Rate (kbps) | Data Rate/ 9.6 kbps | Code Rate | Symbol Repetition Factor Before the Interleaver | Modulation | Walsh Channels | Number of Binary Code Symbols in All the Subpackets | Effective Code Rate Including Repetition |
|---|---|---|---|---|---|---|---|---|---|
| 192 | 4 | 9.6 | 1.000 | 1/4 | 2 | BPSK on I | ++-- | 6,144 | 1/32 |
| 192 | 3 | 12.8 | 1.333 | 1/4 | 2 | BPSK on I | ++-- | 4,608 | 1/24 |
| 192 | 2 | 19.2 | 2.000 | 1/4 | 2 | BPSK on I | ++-- | 3,072 | 1/16 |
| 192 | 1 | 38.4 | 4.000 | 1/4 | 2 | BPSK on I | ++-- | 1,536 | 1/8 |
| 384 | 4 | 19.2 | 2.000 | 1/4 | 1 | BPSK on I | ++-- | 6,144 | 1/16 |
| 384 | 3 | 25.6 | 2.667 | 1/4 | 1 | BPSK on I | ++-- | 4,608 | 1/12 |
| 384 | 2 | 38.4 | 4.000 | 1/4 | 1 | BPSK on I | ++-- | 3,072 | 1/8 |
| 384 | 1 | 76.8 | 8.000 | 1/4 | 1 | BPSK on I | ++-- | 1,536 | 1/4 |
| 768 | 4 | 76.8 | 4.000 | 1/4 | 1 | QPSK | ++-- | 12,288 | 1/16 |
| 768 | 3 | 102.4 | 5.333 | 1/4 | 1 | QPSK | ++-- | 9,216 | 1/12 |
| 768 | 2 | 153.6 | 8.000 | 1/4 | 1 | QPSK | ++-- | 6,144 | 1/8 |
| 768 | 1 | 307.2 | 16.000 | 1/4 | 1 | QPSK | ++-- | 3,072 | 1/4 |
| 1,536 | 4 | 76.8 | 8.000 | 1/4 | 1 | QPSK | +- | 24,576 | 1/16 |
| 1,536 | 3 | 102.4 | 10.667 | 1/4 | 1 | QPSK | +- | 18,432 | 1/12 |
| 1,536 | 2 | 153.6 | 16.000 | 1/4 | 1 | QPSK | +- | 12,288 | 1/8 |
| 1,536 | 1 | 307.2 | 32.000 | 1/4 | 1 | QPSK | +- | 6,144 | 1/4 |
| 2,304 | 4 | 115.2 | 12.000 | 1/4 | 1 | QPSK | ++--/+- | 36,864 | 1/16 |
| 2,304 | 3 | 153.6 | 16.000 | 1/4 | 1 | QPSK | ++--/+- | 27,648 | 1/12 |
| 2,304 | 2 | 230.4 | 24.000 | 1/4 | 1 | QPSK | ++--/+- | 18,432 | 1/8 |
| 2,304 | 1 | 460.8 | 48.000 | 1/4 | 1 | QPSK | ++--/+- | 9,216 | 1/4 |
| 3,072 | 4 | 153.6 | 16.000 | 1/5 | 1 | QPSK | ++--/+- | 36,864 | 1/12 |
| 3,072 | 3 | 204.8 | 21.333 | 1/5 | 1 | QPSK | ++--/+- | 27,648 | 1/9 |
| 3,072 | 2 | 307.2 | 32.000 | 1/5 | 1 | QPSK | ++--/+- | 18,432 | 1/6 |
| 3,072 | 1 | 614.4 | 64.000 | 1/5 | 1 | QPSK | ++--/+- | 9,216 | 1/3 |
| 4,608 | 4 | 230.4 | 24.000 | 1/5 | 1 | QPSK | ++--/+- | 36,864 | 1/8 |
| 4,608 | 3 | 307.2 | 32.000 | 1/5 | 1 | QPSK | ++--/+- | 27,648 | 1/6 |
| 4,608 | 2 | 460.8 | 48.000 | 1/5 | 1 | QPSK | ++--/+- | 18,432 | 1/4 |
| 4,608 | 1 | 921.6 | 96.000 | 1/5 | 1 | QPSK | ++--/+- | 9,216 | 1/2 |
| 6,144 | 4 | 307.2 | 32.000 | 1/5 | 1 | QPSK | ++--/+- | 36,864 | 1/6 |
| 6,144 | 3 | 409.6 | 42.667 | 1/5 | 1 | QPSK | ++--/+- | 27,648 | 2/9 |
| 6,144 | 2 | 614.4 | 64.000 | 1/5 | 1 | QPSK | ++--/+- | 18,432 | 1/3 |
| 6,144 | 1 | 1228.8 | 128.000 | 1/5 | 1 | QPSK | ++--/+- | 9,216 | 2/3 |

Hybrid Automatic-Repeat-Request (HARQ) is supported for both autonomous and scheduled users, both of which may access the R-ESCH.

For the case in which the first code is a Rate 1/2 code, the frame is encoded as a Rate 1/4 code and the encoded symbols are divided equally into two parts. The first half of the symbols are sent in the first transmission, the second half in the second transmission, then the first half in the third transmission and so on.

Multiple ARQ-channel synchronous operation may be supported with fixed timing between the retransmissions: a fixed number of sub-packets between consecutive sub-packets of same packet may be allowed. Interlaced transmissions are allowed as well. As an example, for 5 ms frames, 4 channel ARQ could be supported with 3 subpacket delay between subpackets.

Table 1 lists example data rates for the Enhanced Reverse Supplemental Channel. A 5 ms subpacket size is described, and the accompanying channels have been designed to suit this choice. Other subpacket sizes may also be chosen, as will be readily apparent to those of skill in the art. The pilot reference level is not adjusted for these channels, i.e. the base station has the flexibility of choosing the T/P to target a given operating point. This max T/P value is signaled on the for- In an example embodiment, turbo coding is used for all the rates. With R=1/4 coding, an interleaver similar to the current cdma2000 reverse link is used, and, if a second subpacket is transmitted, it has the same format as the first subpacket. With R=1/5 coding, an interleaver similar to the cdma2000 Forward Packet Data Channel is used, and if a second subpacket is transmitted, the sequence of encoded and interleaved symbols selected for the second subpacket follow those selected for the first subpacket. At most, two subpacket transmissions are allowed, and if a second subpacket is transmitted, it uses the same data rate as the first subpacket transmission.

The number of bits per encoder packet includes the CRC bits and 6 tail bits. For an encoder packet size of 192 bits, a 12-bit CRC is used; otherwise, a 16-bit CRC is used. The number of information bits per frame is 2 more than with the corresponding rates with cdma2000. The 5-ms slots are assumed to be separated by 15 ms to allow time for ACK/NAK responses. If an ACK is received, the remaining slots of the packet are not transmitted.

The 5 ms subpacket duration, and associated parameters, just described, serve as an example only. Any number of combinations of rates, formats, subpacket repetition options, subpacket duration, etc. will be readily apparent to those of skill in the art in light of the teaching herein. An alternate 10 ms embodiment, using 3 ARQ channels, could be deployed.

In one embodiment, a single subpacket duration or frame size is selected. For example, either a 5 ms or 10 ms structure would be selected. In an alternate embodiment, detailed further below, a system may support multiple frame durations.

F-CACKCH

The Forward Common Acknowledgement Channel or F-CACKCH is used by the base station to acknowledge the correct reception of the R-ESCH, as well as to extend an existing grant. An acknowledgement (ACK) on the F-CACKCH indicates correct reception of a subpacket. Additional transmission of that subpacket by the mobile station is unnecessary. The negative acknowledgement (NAK) on the F-CACKCH allows the mobile station to transmit the next subpacket up to the maximum allowed number of subpacket per packet. A third command, the ACK-and-Continue, allows the base station to acknowledge successful reception of a packet and, at the same time, permit the mobile station to transmit using the grant that led to the successfully received packet. One embodiment of the F-CACKCH uses +1 values for the ACK symbols, NULL symbols for the NAK symbols, and −1 values for the ACK-and-Continue symbols. In various example embodiments, detailed further below, up to 96 Mobile IDs can be supported on one F-CACKCH. Additional F-CACKCHs may be deployed to support additional Mobile IDs.

A Hadamard Encoder is one example of an encoder for mapping onto a set of orthogonal functions. Various other techniques may also be deployed. For example, any Walsh Code or Orthogonal Variable Spreading Factor (OVSF) code generation may be used to encode. Different users may be transmitted to at different power levels if independent gain blocks are deployed. The F-CACKCH conveys one dedicated tri-valued flag per user. Each user monitors the F-ACKCH from all base stations in its Active Set (or, alternatively, signaling may define a reduced active set to reduce complexity).

In various examples detailed below, two channels are each covered by a 128-chip Walsh cover sequence. One channel is transmitted on the I channel, and the other is transmitted on the Q channel. Another embodiment of the F-CACKCH uses a single 128-chip Walsh cover sequence to support up to 192 mobile stations simultaneously. This approach uses 10-ms duration for each tri-valued flag.

There are several ways of operating the ACK channel. In one embodiment, it may be operated such that a "1" is transmitted for an ACK. No transmission implies a NAK, or the "off" state. A "−1" transmission refers to ACK and continue, i.e. the same grant is repeated to the MS. This saves the overhead of a new grant channel.

To review, when the MS has a packet to send that requires usage of the R-ESCH, it sends the request on the R-REQCH. The base station may respond with a grant using the F-CGCH, or the F-GCH. However, this operation is somewhat expensive. To reduce the forward link overhead, F-CACKCH can send the "ACK-and-Continue" flag, which extends the existing grant at low cost by the scheduling base station. This method works for both individual and common grants. ACK-and-Continue is used from the granting base station, and extends the current grant for 1 more encoder packet on the same ARQ channel.

Various embodiments are described herein with reference to transmission of the common acknowledgement channel (F-CACKCH). Those of skill in the art will recognize that the principles described herein are applicable to any kind of command sequence or other data sequences.

Figure 5:
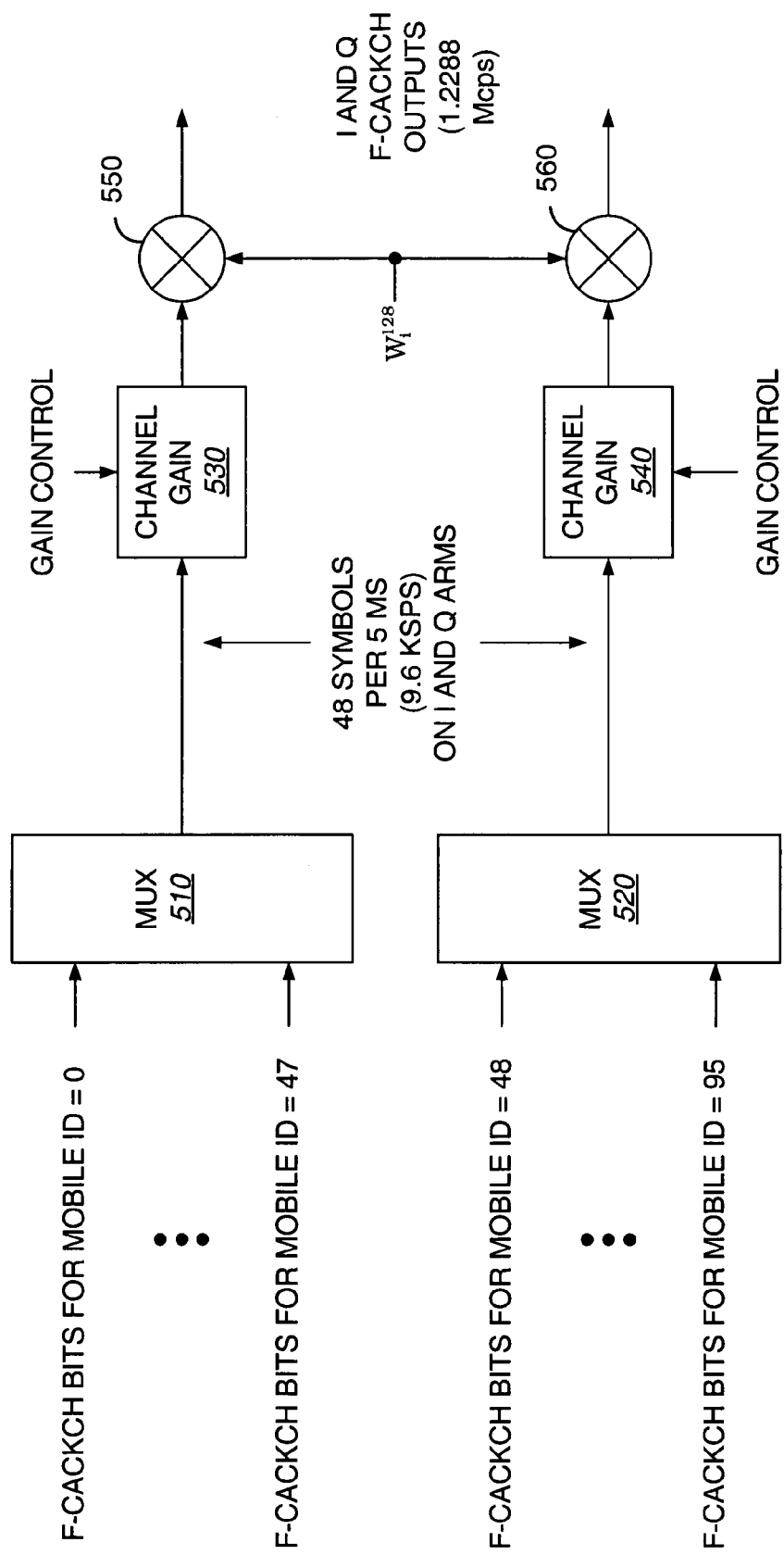
FIG. 5 depicts a prior art embodiment of a portion of a command stream transmitter.

FIG. 5 depicts a prior art embodiment of a portion of a command stream transmitter. Command streams for delivery to one or more mobile stations may be combined into a shared command channel. In this example, forward link acknowledgment commands for up to 96 mobile stations are delivered to muxes 510 and 520, 48 command streams delivered to each. The command streams are comprised of acknowledgment commands, including acknowledge (ACK), negative acknowledge (NAK), and acknowledge and continue (Ack-and-Continue), as described above. Muxes 510 and 520 select command sequences, one at a time, to form TDM sequences, one for in-phase transmission, the other for quadrature transmission. In this example the TDM sequences comprise 48 symbols every five milliseconds (9.6 ksps). The TDM sequences are gain controlled in channel gain blocks 530 and 540, respectively. The gain control TDM sequences are covered in multipliers 550 and 560 with an in-phase and quadrature covering sequence, respectively. In this example, the covering sequence is a 128-bit Walsh sequence, $W_i^{128}$. The resultant outputs from multipliers 550 and 560 are the I and Q F-CACKCH outputs for transmission at 1.2288 Mcps.

The output of FIG. 5 may be combined with other data and/or control signals that are suitably covered, and transmitted to one or more mobile stations. Thus, a TDM on CDM approach is taken to transmit multiple commands to a plurality of mobile stations using a shared CDM channel. One drawback to this approach is that, for a given probability of error, both the peak and average power requirements are higher than required with embodiments of the present invention, disclosed herein. This technique has been used successfully in the prior art by increasing the allowed probability of error to provide for an acceptable peak power requirement, as well as average power consumption. This trade-off may prove acceptable in certain situations, for example, a power control loop. In a power control loop, it is common for single bit up or down command to be transmitted. A power control loop controls the commands so that the received power arrives at a desired power set point. If a power control command is received in error, the power control loop will correct that error. However, in other situations, such as the forward link common acknowledgement channel (F-CACKCH), proposed for the 1xEV-DV system, described above, the performance requirement specified may be unattainable, or too costly, using a TDM on CDM approach. For example, while a power control command error may cause the transmitted power to be slightly too high for a time, thus using more of the shared resource than required, or too low for a time, causing the error rate to climb, typical power control schemes are designed with fast power control to combat such situations and restore the transmission power to the desired level quickly, thus minimizing any undue system performance deterioration. In contrast, a false acknowledge (ACK) command may cause dropped packets. While a NAK often allows an additional subpacket to be transmitted, potentially resulting in correct reception when combined with previously transmitted subpackets, a false ACK may require dropped packets to be resent completely, most likely after interference by a higher layer protocol, and with significant delay. A false Ack-and-Continue has the same problems. A false NAK, meaning the packet has already been received correctly, results in additional subpackets being transmitted needlessly. All of these scenarios may erode the performance of the system. Thus, in some cases, commands, such as the HARQ commands, may be advantageously transmitted with lower error rate. This would translate to a higher average transmission power and a very high (perhaps unattainable) peak power if the prior art apparatus depicted in FIG. 5 is deployed.

Figure 6:
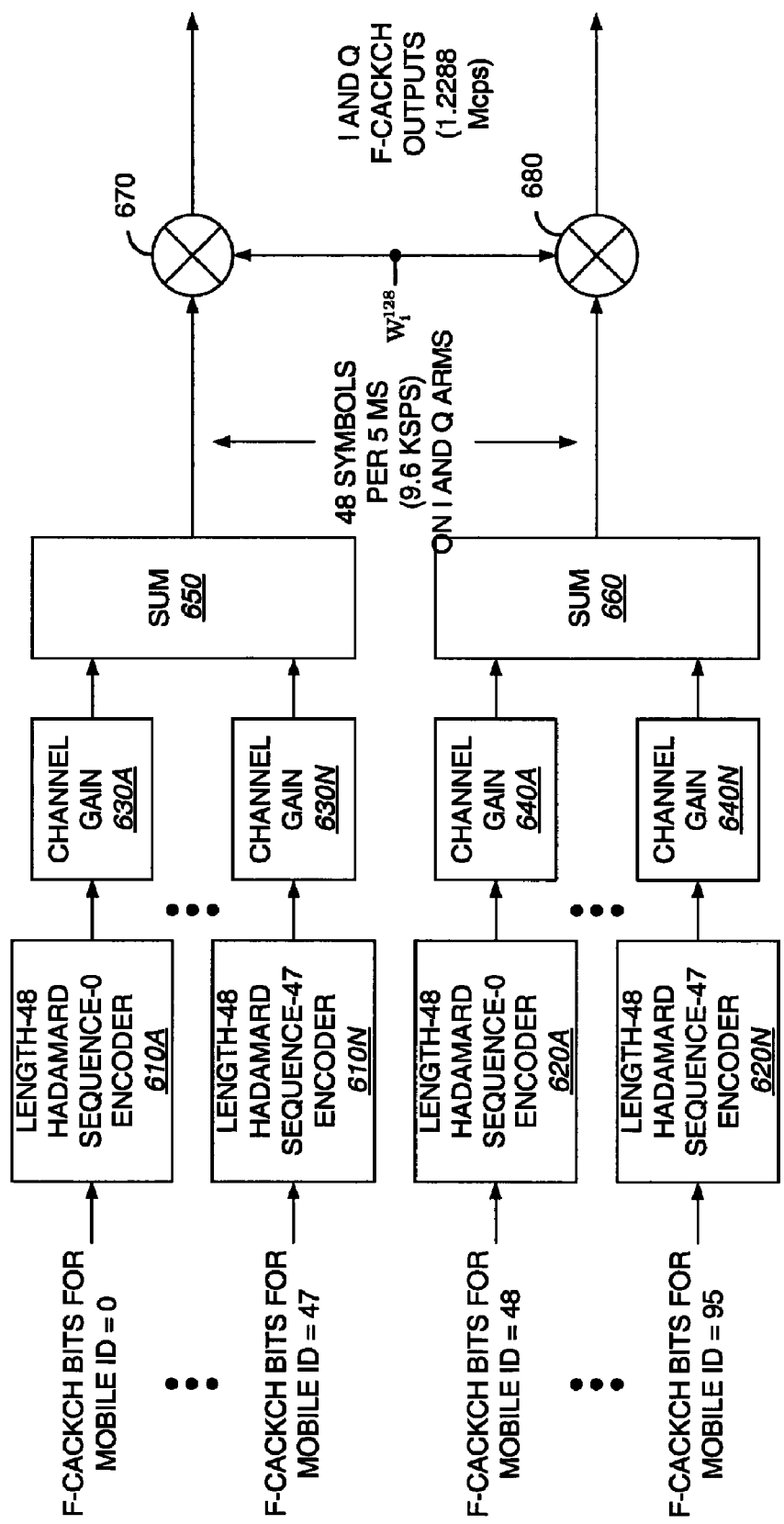
FIG. 6 depicts an embodiment of a CDM on CDM encoder for receiving a plurality of input sequences, combining them using code division multiplexing, and transmitting the combined signal along with other CDM signals to one or more mobile stations.

FIG. 6 depicts an embodiment of a CDM on CDM encoder for receiving a plurality of input sequences, combining them using code division multiplexing, and transmitting the combined signal along with other CDM signals to one or more mobile stations. This embodiment is shown with F-CACKCH command streams for 96 mobile stations as an example. Those of skill in the art will recognize that any sequence type, command or data, may be used instead. The first 48 command streams, identified as directed to mobile identification numbers 0 to 47, will be combined and transmitted on the I channel. The second 48 command streams, identified as directed to mobile identification numbers 48 to 96, will be combined and transmitted on the Q channel. The first 48 command streams are each encoded with a covering sequence. In the example embodiment, the command streams are encoded using length-48 Hadamard sequence encoders, 610A-610N, respectively. The Hadamard sequence number used in each encoder corresponds to the mobile identification number. However, the sequence assignment is arbitrary, and other configurations will be readily apparent to those of skill in the art. The outputs of Hadamard encoders 610A-610N may be individually gain controlled in channel gain blocks 630A-630N, respectively.

The second 48 command streams are also encoded with a covering sequence. In this example, they are covered using length-48 Hadamard encoders 620A-620N, respectively, in similar fashion as described above with encoders 610A-610N. Again, the sequence assignment is arbitrary. In similar fashion, the outputs of Hadamard encoders 620A-610N may be individually gain controlled in channel gain blocks 640A-640N, respectively.

The outputs of channel gain blocks 630A-630N and 640A-640N are delivered to be combined in summers 650 and 660, respectively. The outputs of summers 650 and 660 are the I and Q CDM signals, respectively. Each comprises 48 symbols per 5 ms (9.6 ksps) for transmission on the I and Q arms. These signals are covered using an I and Q covering sequence, collectively identified by $W_i^{128}$, in multipliers 670 and 680, respectively, to produce the I and Q F-CACKCH outputs at 1.2288 Mcps. These outputs may be combined with other CDM covered signals for transmission to one or more mobile stations. Again, those of skill in the art will recognize that the embodiment depicted in FIG. 6 is but one example, and the principle of combining sequences using CDM, and then covering the CDM combined sequences for transmission may be applied to any control and/or data sequences.

Note further that using QPSK, as shown, is only an example. It has the benefit of allowing two different CDM on CDM signals to be transmitted using the orthogonality provided by QPSK. Other modulation formats may also be supported. For example, BPSK may be used as an alternative.

One of the advantages of using an embodiment such as that depicted in FIG. 6, in contrast with the prior art shown in FIG. 5, is that the peak power requirements can be made much lower for a desired error rate. In some instances, the embodiment of FIG. 6 may be able to perform to a desired specification that is impossible to meet with an architecture such as that shown in FIG. 5. Furthermore, the average power required for the embodiment shown in FIG. 6 will also generally be lower.

Figure 7A:
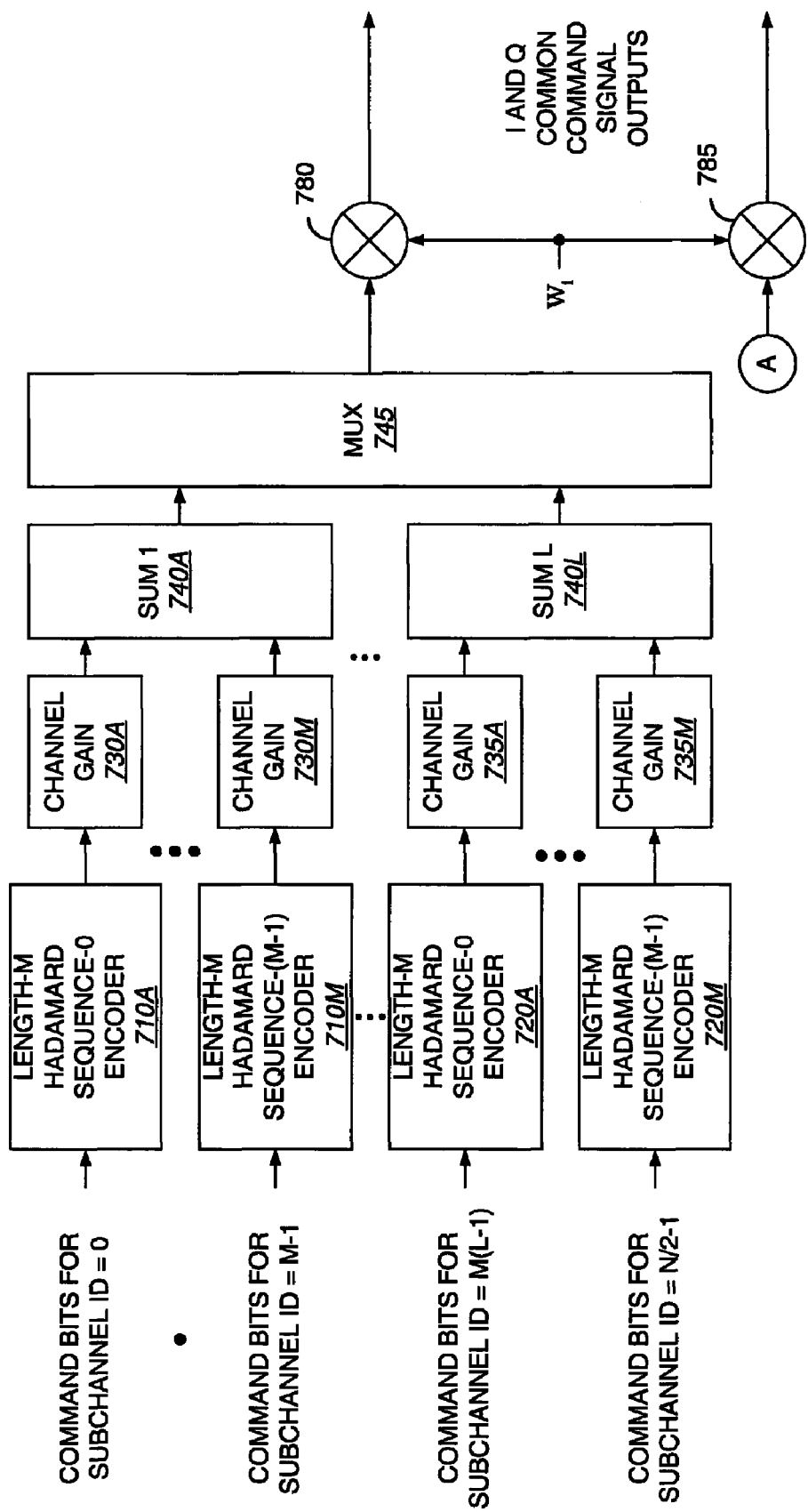
FIG. 7 depicts an embodiment combining CDM and TDM techniques on a CDM signal.
Figure 7B:
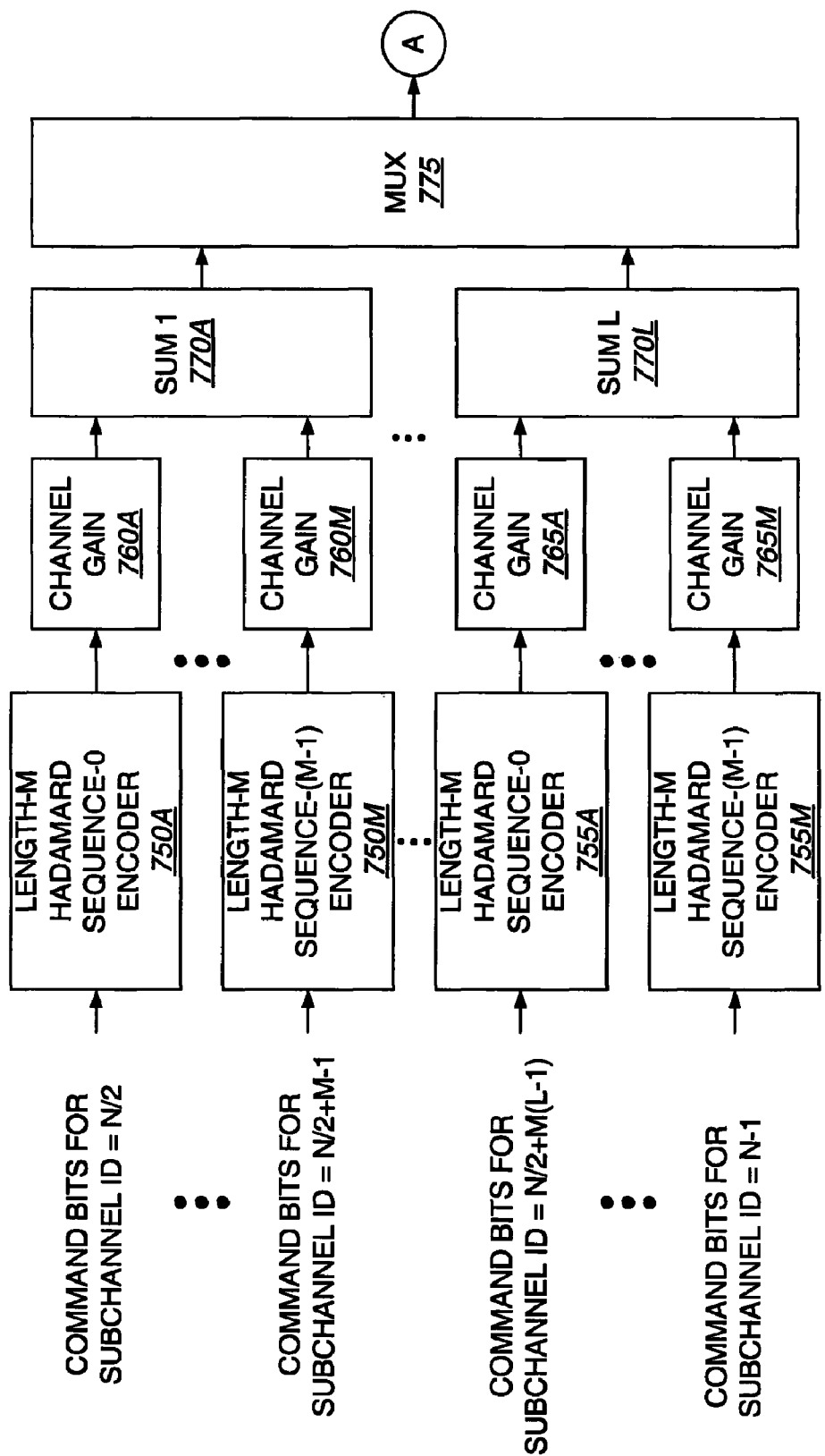

FIG. 7 depicts an embodiment combining CDM and TDM techniques on a CDM signal. In some cases, a CDM on CDM encoder, such as that described in FIG. 6, may suffer from increasing cross-talk interference from the input sequences directed to the other mobile stations of the F-CACKCH CDM channel when the orthogonality period grows longer. For example, due to the effects of multipath, some loss of orthogonality may be present in the 5 ms frame given in example embodiments above. The embodiment depicted in FIG. 7 is generalized as to the number of input sequences, length of the encoders, number inputs to summers and Muxes, and the like. The other embodiments disclosed herein may be generalized in like manner, but are described with respect to a specific embodiment for clarity of discussion. Those of skill in the art will readily apply the teachings herein to myriad encoder configurations.

In this example, two signals are generated, one for transmission on the in-phase channel and one for transmission on the quadrature channel. Each signal is comprised of a time division multiplexing of multiple CDM channels. The resultant signals are covered once more to create a signal suitable for transmission in CDM fashion with other data and/or control signals. Thus, essentially, a CDM on TDM on CDM signal is generated.

There are N input sequences to be combined onto a common command signal (of course, non-command sequences could also be combined to form any type of common signal). In some deployments, each input sequence is directed to a single mobile station. One example of such a plurality of input sequences are the ACK/NAK/Ack-and-Continue commands, each generated for a unique mobile station, that form the F-CACKCH, described above. In alternate embodiments, one or more input sequences may be directed to a single mobile station. To indicate their generality, each input sequence is labeled as the command bits for a subchannel ID, where the subchannel ID ranges from 0 to N−1. (The subchannel ID may correspond to a mobile station ID in certain embodiments.) There are M CDM channels combined on each TDM channel. There are L time slots in each TDM channel. Thus, dividing the N input sequences across the I and Q channels, there are N/2 input sequences for each channel phase. Thus, the relationship between M, N and L is given as M=N/(2*L).

So, the first M input sequences are covered with length-M Hadamard sequences in encoders 710A-710M. M different Hadamard sequences may be assigned arbitrarily to the input sequences. In this example, the sequence matches the subchannel ID. Groups of M input sequences are thus assigned, until the last M input sequences designated for the I channel (M(L−1)-(N/2)−1) are delivered to encoders 720A-720M. Note that the assignment of the particular Hadamard sequence is arbitrary, although in this example they are assigned as subchannel ID mod M. The next N/2 input sequences are encoded similarly, as shown. M sequences N/2-N/2+M−1 are delivered to encoders 750A-750M. The assignment continues until the final M sequences (N/2+M(L−1)-N−1) are delivered to encoders 755A-755M. Again, the Hadamard sequence assignment is arbitrary, but in this example is subchannel ID mod M.

Each of the outputs of the Hadamard encoders may be modified by a channel gain in channel gain blocks 730A-730M through 735A-735M and 760A-760M through 765A-765M, respectively. For each phase (I and Q), there are L summers, 740A-740L for the I channel, and 770A-770L for the Q channel, each of which combine their respective M covered input sequences to form 2L CDM sequences. The L in-phase CDM sequences, from summers 740A-740L, are time division multiplexed in mux 745 to produce a CDM on TDM signal for the I channel. Similarly, the L quadrature CDM sequences, from summers 770A-770L, are time division multiplexed in mux 775 to produce a CDM on TDM signal for the Q channel. The CDM on TDM signals are then covered with a covering sequence (including an in-phase and quadrature component), denoted $W_i$, in multipliers 780 and 785, respectively, to generate the I and Q common command signal outputs. These covered signals are thus made ready to be combined and transmitted in CDM fashion with other data and/or control signals. (Again, those of skill in the art will recognize that QPSK is but an option, it is not mandatory. Furthermore, the common signal may comprise sequences other than command signals. And, the shared channel may be transmitted to and received and decoded by any combination of one or more mobile stations.) Thus, the generalized embodiment shown in FIG. 7 illustrates the use of CDM on TDM on CDM combining of input sequences. This technique allows for lowering of peak and average power, due to the CDM features, as well as a potential increase in the number of users and mitigation of loss of orthogonality due to the TDM features.

Those of skill in the art will recognize that the embodiment of FIG. 7 is general, and may deployed with myriad combinations of number of CDM channels, M, time slots, L, and input sequences N. Neither do alternative embodiments need to contain the symmetry described in FIG. 7. For example, the I and Q signals may be constructed using different parameters. Furthermore, the muxes may be configured to time division multiplex the summer outputs, each of which may or may not combine the same number of CDM channels. Two example embodiments for the F-CACKCH, described above, are given here for illustration. In a first embodiment, an orthogonal period of ½₄₀₀ seconds is generated by using M=4 and L=12, on both the I and Q channels, to combine 96 input sequences comprising ACK/NAK/Ack-and-Continue commands directed to up to 96 mobile stations with a 128-chip Walsh cover sequence at 1.2288 Mcps. In a second example embodiment, an orthogonal period over 1.25 ms is generated by using M=12 and L=4, to process the same inputs and generate the same output as described in the first embodiment. Those of skill in the art will readily devise any number of combinations in accordance with the present invention.

Figure 8:
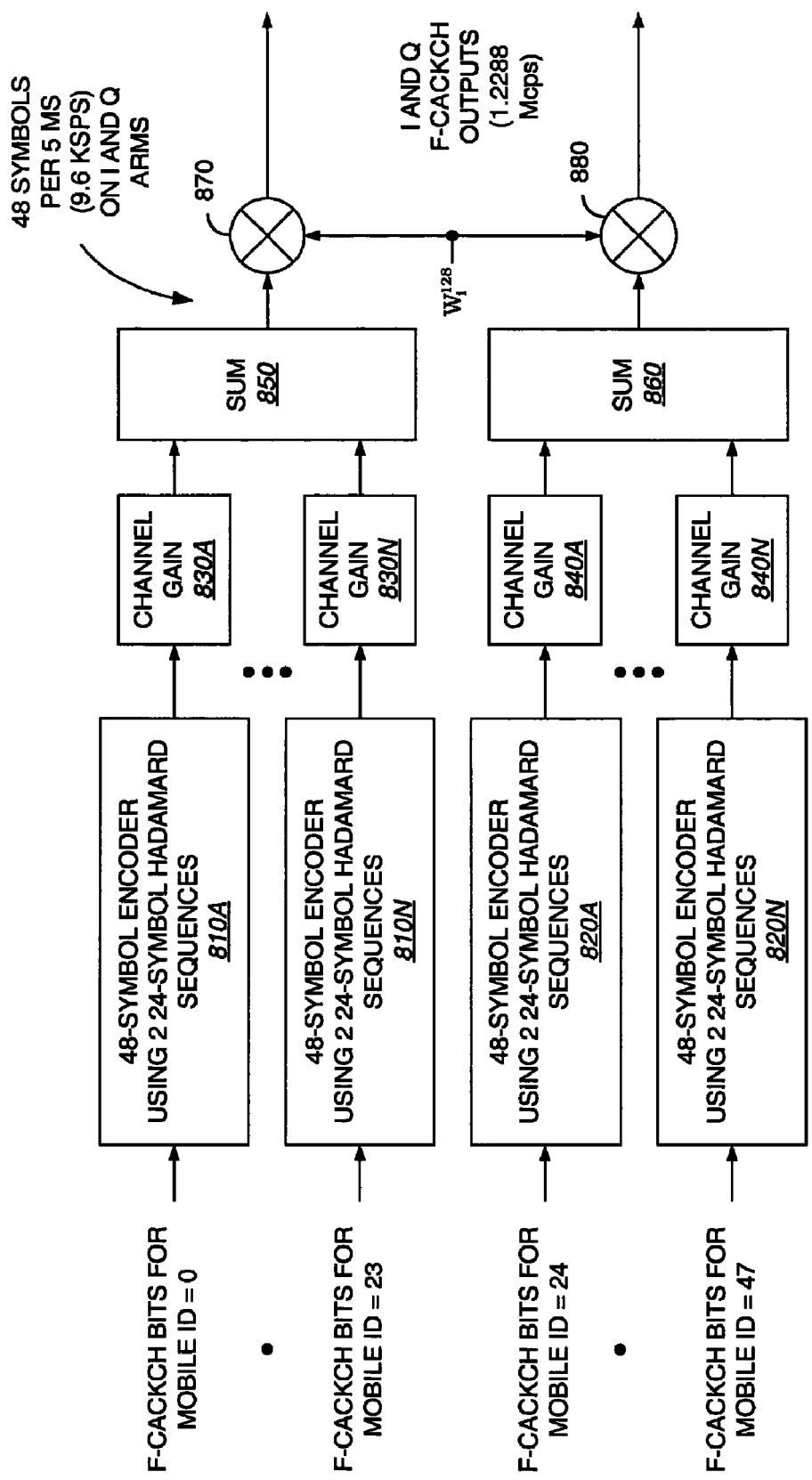
FIG. 8 depicts an embodiment utilizing pattern repetition.

FIG. 8 depicts an embodiment utilizing pattern repetition. While this embodiment may be generalized, in similar fashion as detailed with respect to FIG. 7, the F-CACKCH is used once more for illustrative purposes. This embodiment uses a CDM approach with pattern-repetition. 48 input sequences, F-CACKCH bits for mobile IDs 0-47, in this example, are delivered to 48-symbol encoders 810A-810N and 820A-820N, for the I and Q channels, respectively. Each 48-symbol encoder uses 2 24-symbol Hadamard Sequences. The encoded outputs are gain adjusted in channel gain blocks 830A-830N and 840A-840N, respectively. Summer 850 combines the respective gain adjusted encoded sequences to produce an I channel CDM signal. Summer 860 combines the respective gain adjusted encoded sequences to produce a Q channel CDM signal. (Note that, as before, using both the I and Q channels to transmit signals is not required. Alternate embodiments may use other modulation schemes, within the scope of the present invention.) The I and Q CDM signals are covered again in multipliers 870 and 880, using complex covering sequence $W_i^{128}$, to produce the I and Q F-CACKCH outputs that may be combined with other signals in CDM fashion and transmitted to one or more mobile stations. Thus, FIG. 8 illustrates yet another embodiment of a CDM on CDM encoding approach.

One advantage of the embodiment of FIG. 8 is that the orthogonal period is reduced from 5 ms to 2.5 ms. Therefore, there is less cross-talk interference from the other possible users of that F-CACKCH. In this example, the repetition used in encoders 810 and 820 does not repeat the same Hadamard sequences, but rather a different sequence for the second transmission is used. So if, for example, a particular user is causing interference to another user on the first transmission, that same user doesn't cause the same interference on the second transmission. This approach reduces the peak crosstalk interference and makes it closer to the average interference. However, in contrast with the embodiment of FIG. 6, half of the number of users are supported with this embodiment.

In one embodiment, the Hadamard sequences selected for the encoders 810 and 820 are as follows. The first 24 symbols for both encoders 810 and 820 are the length-24 Hadamard sequence identified by the mobile ID mod 24. The second 24 symbols for encoders 810 are the length 24 Hadamard sequences identified by (mobile ID+5) mod 24. The second 24 symbols for encoders 820 are the length 24 Hadamard sequences identified by (mobile ID+7) mod 24. There is no particular significance to those values, although they are easy to calculate. Those of skill in the art will readily extend these principles to various other repetition sequences. The result is that if a particular user is causing interference to another user on the first transmission, the same user doesn't cause the same interference on the second transmission. This reduces the peak cross-talk interference and makes the interference closer to the average interference.

In an alternate embodiment, the Hadamard sequence values are assigned in a time-varying manner. In the first embodiment, just described, with two repetitions including the patterns described, the peak cross-talk interference over the two transmissions (i.e., a frame) may be much higher than the average interference. If two users are assigned such that this peak interference occurs, it may occur every frame. With the time-varying approach, even if the cross-talk interference is bad on one frame, the same users will not have the same bad cross-talk interference on the following frames since the Hadamard sequences are assigned in a time-varying manner.

Various other alternatives are also envisioned. If more orthogonality protection is desired, additional repetition may be introduced. Furthermore, the repetition technique described with respect to FIG. 8 may be combined with the TDM approach introduced in the embodiment of FIG. 7. Those of skill in the art will readily configure myriad combinations according to the principles disclosed herein.

The wireless communication device 106, described above with respect to FIG. 3, is operable to receive and demodulate any of the various CDM transmission signals described above. Demodulator 325 may be equipped to perform decovering and demultiplexing of the various TDM and CDM signals described, to extract the desired sequence of symbols transmitted from the base station 104. In many of the examples above, those symbols would be the respective bits of the F-CACKCH designated for that particular mobile station 106.

It should be noted that in all the embodiments described above, method steps can be interchanged without departing from the scope of the invention. The descriptions disclosed herein have in many cases referred to signals, parameters, and procedures associated with the 1xEV-DV standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   a first Hadamard encoder for receiving a plurality of symbol streams for respective ones of a plurality of remote stations and encoding each of the symbol streams with one of a plurality of covering sequences with pattern repetition to form a plurality of covered streams, wherein each of the plurality of covering sequences is based on a remote station identifier for the respective one of the plurality of remote stations, wherein the first Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;
   a summer for summing the plurality of covered streams to form a first Code Division Multiplexed (CDM) signal; and
   a second encoder for covering the first CDM signal with a Walsh covering sequence to form first covered CDM signal.

2. The apparatus of claim 1, further comprising one or more channel gain blocks for receiving a plurality of gain values and multiplying the plurality of covered streams by the plurality of gain values, respectively, prior to delivery to the summer.

3. The apparatus of claim 1, wherein one or more of the plurality of symbol streams comprises command values, the command values indicating acknowledgement, negative acknowledgement, or acknowledge and continue.

4. The apparatus of claim 1, further comprising a transmitter for receiving the first covered CDM signal and one or more additional covered signals, combining the first covered CDM signal and the one or more additional covered signals to form a combined CDM signal, and transmitting the combined CDM signal to a remote station.

5. The apparatus of claim 1, wherein each sequence is assigned in a time varying manner.

6. A non-transitory processor readable media, operable to perform the following steps;
   Hadamard covering each of a plurality of symbol streams with one of a plurality of covering sequences with pattern repetition to form a plurality of covered streams, wherein each of the plurality of covering sequences is based on a remote station identifier of the respective remote station, wherein Hadamard covering includes utilizing a Hadamard encoder in which the Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;
   summing subsets of the plurality of covered streams to form a plurality of CDM signal;
   time division multiplexing the plurality of CDM signals to form a TDM signal; and
   covering the TDM signal with a Walsh covering sequence to form a first covered TDM/CDM signal configured for transmission in CDM fashion.

7. A non-transitory processor readable media, operable to perform the following steps:
   Hadamard covering each of a plurality of symbol streams for respective ones of a plurality of remote stations with one of a plurality of covering sequences with pattern repetition to form a plurality of covered streams, wherein each of the plurality of covering sequences is based on a remote station identifier for the respective one of the plurality of remote stations, wherein Hadamard covering includes utilizing a Hadamard encoder in which the Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

summing the plurality of covered streams to form a first Code Division Multiplexed (CDM) signal; and covering the first CDM signal with a Walsh covering sequence to form a first covered CDM signal.

8. An apparatus, comprising:

means for Hadamard covering each of a plurality of symbol streams with one of a plurality of covering sequences with pattern repetition to form a plurality of covered, streams, wherein each of the plurality of covering sequences is based on a remote station identifier of a respective remote station, wherein Hadamard covering includes utilizing a Hadamard encoder in which the Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

means for summing subsets of the plurality of covered streams to form a plurality of CDM signals;

means for time division multiplexing the plurality of CDM signals to form a TDM signal; and means for covering the TDM signal with a Walsh covering sequence to form a first covered TDM/CDM signal configured for transmission in CDM fashion.

9. A method of multiplexing a plurality of symbol streams, comprising:

Hadamard covering each of a plurality of symbol streams with one of a plurality of covering sequences with pattern repetition to form a plurality of covered streams, wherein each of the plurality of covering sequences is based on a remote station identifier of the respective remote station, wherein Hadamard covering includes utilizing a Hadamard encoder in which the Hadamard encoder segments encoding time into two or more segments and covers each of the plurality of symbol streams with two or more sequences with pattern repetition, each sequence for covering during the two or more segments, respectively, and the sequence covering each symbol stream during a segment being, unique to the respective symbol stream, and wherein a first Hadamard sequence is selected corresponding to a first remote station identifier and a second Hadamard sequence is selected based on a second remote station identifier;

summing subsets of the plurality of covered streams to form a plurality of CDM signals;

time multiplexing the plurality of CDM signals to form a TDM signal; and covering the TDM signal with a Walsh covering sequence to form a first covered TDM/CDM signal configured for transmission in CDM fashion.

10. The method of claim 9, further comprising:

combining the covered TDM/CDM signal and one or more additional covered signals; and transmitting the combined CDM signals to one or more remote stations.

11. An apparatus, comprising:

a plurality of CDM encoders for receiving a plurality of symbol streams for a respective plurality of remote stations and producing a plurality of covered CDM signals, each CDM encoder comprising:

a first Hadamard encoder for receiving the plurality of symbol streams and encoding each of the symbol streams with one of a plurality of covering sequences with pattern repetition to form a plurality of covered streams, wherein each of the plurality of covering sequences is based on a remote station identifier of the respective remote station, wherein the first Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

a summer for summing the plurality of covered streams to form a CDM signal;

a time multiplexer for receiving the plurality of covered CDM signals and forming a Time Division Multiplexed (TDM) signal comprising the plurality of covered CDM signals; and a second encoder for covering the TDM signal with a Walsh covering sequence to form a covered TDM/CDM signal configured for transmission in CDM fashion.

12. The apparatus of claim 11, wherein each CDM encoder further comprises one or more channel gain blocks for receiving a plurality of gain values and multiplying the plurality of covered streams by the plurality of gain values, respectively, prior to delivery to the summer.

13. The apparatus of claim 11, further comprising a transmitter for receiving the covered TDM/CDM signal and one or more additional covered signals, combining the covered TDM/CDM signal and one or more additional covered signals to form a combined CDM signal, and transmitting the combined CDM signal to a remote station.

14. An apparatus, comprising:

means for Hadamard covering each of a plurality of symbol streams for respective ones a plurality of remote stations with one of a plurality of covering sequences with pattern repetition to form a plurality of covered streams, wherein each of the plurality of covering sequences is based on a remote station identifier for the respective one of the plurality of remote stations, wherein Hadamard covering includes utilizing a Hadamard encoder in which the Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

means for summing the plurality of covered streams to form a first Code Division Multiplexed (CDM) signal; and means for covering the first CDM signal with a Walsh covering sequence to form a first covered CDM signal.

15. A wireless communication system, including a wireless communication device comprising:

a plurality of CDM encoders for receiving a plurality of symbol streams for a respective plurality of remote stations and producing a plurality of covered CDM signals, each CDM encoder comprising:

a first Hadamard encoder for receiving the plurality of symbol streams and encoding each of the symbol streams with one of a plurality of covering sequences with pattern repetition to form a plurality of covered streams, wherein each of the plurality of covering sequences is based on a remote station identifier of the respective remote station, wherein the first Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

a summer for summing the plurality of covered streams to form a CDM signal;

a time multiplexer for receiving the plurality of covered CDM signals and forming, a Time Division Multiplexed (TDM) signal comprising the plurality of covered CDM signals; and a second encoder for covering the TDM signal with a Walsh covering sequence to form a covered TDM/CDM signal configured for transmission in CDM fashion.

16. A wireless communication system, including a first wireless communication device comprising:

a first Hadamard encoder for receiving a plurality of symbol streams for respective ones of a plurality of remote stations and encoding each of the symbol streams with one of a plurality of covering sequences with pattern repetition to form a plurality of covered streams, wherein each of the plurality of covering sequences is based on a remote station identifier for the respective one of the plurality of remote stations, wherein the first Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

a summer for summing the plurality of covered streams to form a first Code Division Multiplexed (CDM) signal; and a second encoder for covering the first CDM signal with a Walsh covering sequence to form a first covered CDM signal.

17. A wireless communication device, comprising:

a first Hadamard encoder for receiving a plurality of symbol streams for respective ones of a plurality of remote stations and encoding each of the symbol streams with one of a plurality of covering sequences with pattern repetition to form a plurality of covered streams, wherein, each of the plurality of covering sequences is based on a remote station identifier for the respective one of the plurality of remote stations, wherein the first Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

a summer for summing the plurality of covered streams to form a first Code Division Multiplexed (CDM) signal; and a second encoder for covering the first CDM signal with a Walsh covering sequence to form a first covered CDM.

18. A wireless communication device, comprising:

a plurality of CDM encoders for receiving a plurality of symbol streams for a respective plurality of remote stations and producing a plurality of covered CDM signals, each CDM encoder comprising:

a first Hadamard encoder for receiving the plurality of symbol streams and encoding each of the symbol streams with one of a plurality of covering sequences with pattern repetition to form a plurality of covered streams, wherein each of the plurality of covering sequences is based on a remote station identifier of the respective remote station, wherein the first Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

a summer for summing the plurality of covered streams to form a CDM signal;

a time multiplexer for receiving the plurality of covered CDM signals and forming a Time Division Multiplexed (TDM) signal comprising the plurality of covered CDM signals; and a second encoder for covering the TDM signal with a Walsh covering sequence to form a covered TDM/CDM signal configured for transmission in CDM fashion.

19. A method of multiplexing a plurality of symbol streams, comprising:

Hadamard covering each of a plurality of symbol streams for respective ones of a plurality of remote stations with one of a plurality of covering sequences with pattern repetition to form a plurality of covered streams, wherein each of the plurality of covering sequences is based on a remote station identifier for the respective one of the plurality of remote stations, wherein Hadamard covering includes utilizing a Hadamard encoder in which the Hadamard encoder segments encoding time into two or more segments and covers each of the plurality of symbol streams with two or more sequences with pattern repetition, each sequence for covering during the two or more segments, respectively, and the sequence covering each symbol stream during a segment being unique to the respective symbol stream, and wherein a first Hadamard sequence is selected corresponding to a first remote station identifier and a second Hadamard sequence is selected based on a second remote station identifier;

summing the plurality of covered streams to form a first Code Division Multiplexed (CDM) signal; and covering the first CDM signal with a Walsh covering sequence to form a first covered CDM signal.

20. The method of claim 19, further comprising multiplying the plurality of covered streams by the plurality of gain values, respectively, prior to summing.

21. The method of claim 19, further comprising:
combining the first covered CDM signal and the one or more additional covered signals; and
transmitting the combined CDM signal to one or more remote stations.

22. The method of claim 19, further comprising:
Hadamard covering each of a second plurality of symbol streams with one of the plurality of covering sequences with pattern repetition to form a second plurality of covered streams;
summing the second plurality of covered streams to form a second CDM signal;
covering the second CDM signal with a second I and Q Walsh covering sequence to form a second covered CDM signal;
transmitting the first covered CDM signal on an in-phase channel; and
transmitting the second covered CDM signal on a quadrature channel.

23. The method of claim 19, wherein one or more of the plurality of symbol streams comprises command values, the command values indicating acknowledgement, negative acknowledgement, or acknowledge and continue.

24. The method of claim 19, wherein the covering each of the plurality of symbol streams comprises:
segmenting the encoding time into two or more segments;
Hadamard covering each of the plurality of symbol streams with two or more sequences with pattern repetition, each sequence for covering during the two or more segments, respectively, and the sequence covering each symbol stream during a segment being unique to the respective symbol stream.

25. The method of claim 24, wherein the two or more sequences are assigned in a time varying manner.

* * * * *